US011137820B2

(12) United States Patent
Ahlström et al.

(10) Patent No.: US 11,137,820 B2
(45) Date of Patent: Oct. 5, 2021

(54) APPARATUS AND METHOD FOR PRESENTING THEMATIC MAPS

(71) Applicant: Amer Sports Digital Services Oy, Vantaa (FI)

(72) Inventors: Mikko Ahlström, Vantaa (FI); Timo Halko, Vantaa (FI); Erik Lindman, Vantaa (FI); Timo Eriksson, Vantaa (FI); Jari Akkila, Vantaa (FI); Heikki Nieminen, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 0 days.

(21) Appl. No.: 16/731,134

(22) Filed: Dec. 31, 2019

(65) Prior Publication Data

US 2020/0133383 A1    Apr. 30, 2020

Related U.S. Application Data

(63) Continuation-in-part of application No. 16/377,267, filed on Apr. 8, 2019, which is a continuation-in-part
(Continued)

(30) Foreign Application Priority Data

Dec. 1, 2015   (FI) ...................................... 20155906
Dec. 1, 2015   (GB) ...................................... 1521192
(Continued)

(51) Int. Cl.
*G06F 1/3287*       (2019.01)
*H04W 4/021*       (2018.01)
(Continued)

(52) U.S. Cl.
CPC .......... *G06F 1/3287* (2013.01); *G06F 1/3265* (2013.01); *G09G 5/006* (2013.01);
(Continued)

(58) Field of Classification Search
CPC ..... G06F 1/3287; G06F 1/3265; G09G 5/006; G09G 2360/06; G09G 2360/08; H04W 52/027; H04W 52/0254
(Continued)

(56) References Cited

U.S. PATENT DOCUMENTS 5,924,980 A      7/1999   Coetzee
6,882,955 B1 *   4/2005   Ohlenbusch ......... A43B 3/0005
                                              702/160
(Continued)

FOREIGN PATENT DOCUMENTS

AU     2007216704 A1    4/2008
CN        1877340 A1    12/2006
(Continued)

OTHER PUBLICATIONS

SHETA et al: Packet scheduling in LTE mobile network. International Journal of Scientific & Engineering Research, Jun. 2013, vol. 4, Issue 6.
(Continued)

*Primary Examiner* — Yazan A Soofi
(74) *Attorney, Agent, or Firm* — Laine IP Oy

(57) ABSTRACT

The invention concerns an apparatus and a method for a personal device. The device comprises at least one processor with at least one processing core, at least one display, at least one sensor, at least one memory including a computer program code. The apparatus determine the location of the apparatus by means of a sensor providing location information to said at least one processing core and transmits a query to a thematic map database server. The apparatus is then
(Continued)

updated with thematic maps related to the location by downloading thematic map data and storing the thematic map data in a memory.

The user is presented on a display in a first display mode with least one downloaded thematic map as one of a suggested activity. A selected activity is initiated and displayed to the user in a first display mode performance-related information relating to physical performance of the user, then a first power-save mode may be entered by switching from the first display mode to a second display mode which displays to the user at least the time and a thematic map with reduced functionality relating to the activity. A second power-save mode may be entered by putting processing core in a hibernating mode and entering a third display mode, where a clock unit updates the display in predefined time intervals at least with the time and at least one item of pre-calculated information.

15 Claims, 13 Drawing Sheets

Related U.S. Application Data of application No. 15/365,972, filed on Dec. 1, 2016, now Pat. No. 10,288,443, application No. 16/731,134, which is a continuation-in-part of application No. 15/784,234, filed on Oct. 16, 2017.

(30) Foreign Application Priority Data

Oct. 17, 2016  (FI) ...................................... 20165790
Oct. 17, 2016  (GB) ...................................... 1617575

(51) Int. Cl.
*H04W 52/02*    (2009.01)
*G09G 5/00*     (2006.01)
*G06F 1/3234*   (2019.01)

(52) U.S. Cl.
CPC ......... *H04W 4/021* (2013.01); *H04W 52/027* (2013.01); *H04W 52/0254* (2013.01); *G09G 2360/06* (2013.01); *G09G 2360/08* (2013.01)

(58) Field of Classification Search
USPC ...................................................... 701/426
See application file for complete search history.

(56) References Cited

U.S. PATENT DOCUMENTS

| | | | |
|---|---|---|---|
| 7,627,423 B2 | 12/2009 | Brooks | |
| 7,706,973 B2 | 4/2010 | McBride et al. | |
| 7,721,118 B1 | 5/2010 | Tamasi et al. | |
| 7,917,198 B2 | 3/2011 | Ahola et al. | |
| 7,938,752 B1 | 5/2011 | Wang | |
| 8,052,580 B2 | 11/2011 | Saalasti et al. | |
| 8,323,188 B2 | 12/2012 | Tran | |
| 8,328,718 B2 | 12/2012 | Tran | |
| 8,538,693 B2 | 9/2013 | McBride et al. | |
| 8,612,142 B2 | 12/2013 | Zhang | |
| 8,655,591 B2 | 2/2014 | Van Hende | |
| 8,781,730 B2 | 7/2014 | Downey et al. | |
| 8,949,022 B1 | 2/2015 | Fahrner et al. | |
| 9,008,967 B2 | 4/2015 | McBride et al. | |
| 9,107,586 B2 | 8/2015 | Tran | |
| 9,222,787 B2 * | 12/2015 | Blumenberg .......... G01C 21/32 |
| 9,317,660 B2 | 4/2016 | Burich et al. | |
| 9,648,108 B2 | 5/2017 | Granqvist et al. | |
| 9,665,873 B2 | 5/2017 | Ackland et al. | |
| 9,829,331 B2 | 11/2017 | McBride et al. | |
| 9,830,516 B1 | 11/2017 | Biswas et al. | |
| 9,907,473 B2 | 3/2018 | Tran | |
| 9,923,973 B2 | 3/2018 | Granqvist et al. | |
| 10,234,290 B2 * | 3/2019 | Lush .......................... G01S 5/02 |
| 10,244,948 B2 | 4/2019 | Pham et al. | |
| 10,327,673 B2 | 6/2019 | Eriksson et al. | |
| 10,415,990 B2 | 9/2019 | Cho et al. | |
| 10,433,768 B2 | 10/2019 | Eriksson et al. | |
| 10,515,990 B2 * | 12/2019 | Hung .................. H01L 29/0653 |
| 10,634,511 B2 | 4/2020 | McBride et al. | |
| 10,816,671 B2 * | 10/2020 | Graham ................ H04W 8/205 |
| 2003/0038831 A1 | 2/2003 | Engelfriet | |
| 2003/0109287 A1 | 6/2003 | Villaret | |
| 2005/0070809 A1 | 3/2005 | Acres | |
| 2005/0086405 A1 | 4/2005 | Kobayashi et al. | |
| 2006/0068812 A1 | 3/2006 | Carro et al. | |
| 2006/0136173 A1 | 6/2006 | Case, Jr. et al. | |
| 2007/0156335 A1 | 7/2007 | McBride et al. | |
| 2007/0208544 A1 | 9/2007 | Kulach et al. | |
| 2007/0276200 A1 | 11/2007 | Ahola et al. | |
| 2008/0052493 A1 | 2/2008 | Chang | |
| 2008/0109158 A1 | 5/2008 | Huhtala et al. | |
| 2008/0158117 A1 | 7/2008 | Wong et al. | |
| 2008/0214360 A1 | 9/2008 | Stirling et al. | |
| 2008/0294663 A1 | 11/2008 | Heinley et al. | |
| 2008/0318598 A1 * | 12/2008 | Fry .......................... G08G 1/005 |
| | | | 455/456.5 |
| 2009/0047645 A1 | 2/2009 | Dibenedetto et al. | |
| 2009/0048070 A1 | 2/2009 | Vincent et al. | |
| 2009/0094557 A1 | 4/2009 | Howard | |
| 2009/0100332 A1 | 4/2009 | Kanjilal et al. | |
| 2009/0265623 A1 | 10/2009 | Kho et al. | |
| 2010/0099539 A1 | 4/2010 | Haataja | |
| 2010/0167712 A1 | 7/2010 | Stallings et al. | |
| 2010/0187074 A1 | 7/2010 | Manni | |
| 2010/0257014 A1 | 10/2010 | Roberts et al. | |
| 2010/0313042 A1 | 12/2010 | Shuster | |
| 2011/0010704 A1 | 1/2011 | Jeon et al. | |
| 2011/0152695 A1 | 6/2011 | Granqvist et al. | |
| 2011/0251822 A1 | 10/2011 | Darley et al. | |
| 2011/0252351 A1 | 10/2011 | Sikora et al. | |
| 2011/0281687 A1 | 11/2011 | Gilley et al. | |
| 2011/0283224 A1 | 11/2011 | Ramsey et al. | |
| 2011/0288381 A1 | 11/2011 | Bartholomew et al. | |
| 2011/0296312 A1 | 12/2011 | Boyer et al. | |
| 2011/0307723 A1 | 12/2011 | Cupps et al. | |
| 2012/0022336 A1 | 1/2012 | Teixeira | |
| 2012/0100895 A1 | 4/2012 | Priyantha et al. | |
| 2012/0109518 A1 | 5/2012 | Huang | |
| 2012/0116548 A1 | 5/2012 | Goree et al. | |
| 2012/0123806 A1 | 5/2012 | Schumann et al. | |
| 2012/0158289 A1 | 6/2012 | Bernheim Brush et al. | |
| 2012/0185268 A1 | 7/2012 | Wiesner et al. | |
| 2012/0219186 A1 | 8/2012 | Wang et al. | |
| 2012/0239173 A1 | 9/2012 | Laikari et al. | |
| 2012/0283855 A1 | 11/2012 | Hoffman et al. | |
| 2012/0289791 A1 | 11/2012 | Jain et al. | |
| 2012/0317520 A1 | 12/2012 | Lee | |
| 2013/0053990 A1 | 2/2013 | Ackland et al. | |
| 2013/0060167 A1 | 3/2013 | Dracup et al. | |
| 2013/0095459 A1 | 4/2013 | Tran | |
| 2013/0127636 A1 | 5/2013 | Aryanpur et al. | |
| 2013/0151874 A1 | 6/2013 | Parks et al. | |
| 2013/0178334 A1 | 7/2013 | Brammer | |
| 2013/0187789 A1 | 7/2013 | Lowe | |
| 2013/0190903 A1 | 7/2013 | Balakrishnan et al. | |
| 2013/0217979 A1 | 8/2013 | Blackadar et al. | |
| 2013/0225370 A1 | 8/2013 | Flynt et al. | |
| 2013/0234924 A1 | 9/2013 | Janefalkar et al. | |
| 2013/0250845 A1 | 9/2013 | Greene et al. | |
| 2013/0304377 A1 | 11/2013 | Van Hende | |
| 2013/0332286 A1 | 12/2013 | Medelius et al. | |
| 2013/0345978 A1 | 12/2013 | Lush et al. | |
| 2014/0018686 A1 | 1/2014 | Medelius et al. | |
| 2014/0046223 A1 | 2/2014 | Kahn et al. | |
| 2014/0094200 A1 | 4/2014 | Schatzberg et al. | |
| 2014/0142732 A1 | 5/2014 | Karvonen | |
| 2014/0149754 A1 | 5/2014 | Silva et al. | |
| 2014/0163927 A1 | 6/2014 | Molettiere et al. | |

(56) References Cited

U.S. PATENT DOCUMENTS

| | | |
|---|---|---|
| 2014/0208333 A1 | 7/2014 | Beals et al. |
| 2014/0218281 A1 | 8/2014 | Amayeh et al. |
| 2014/0235166 A1 | 8/2014 | Molettiere et al. |
| 2014/0237028 A1 | 8/2014 | Messenger et al. |
| 2014/0257533 A1 | 9/2014 | Morris et al. |
| 2014/0275821 A1 | 9/2014 | Beckman |
| 2014/0288680 A1* | 9/2014 | Hoffman ............. G09B 5/02 700/91 |
| 2014/0336796 A1 | 11/2014 | Agnew |
| 2014/0337036 A1 | 11/2014 | Haiut et al. |
| 2014/0337450 A1 | 11/2014 | Choudhary et al. |
| 2014/0343380 A1 | 11/2014 | Carter et al. |
| 2014/0350883 A1 | 11/2014 | Carter et al. |
| 2014/0365107 A1 | 12/2014 | Dutta et al. |
| 2014/0372064 A1 | 12/2014 | Darley et al. |
| 2015/0006617 A1 | 1/2015 | Yoo et al. |
| 2015/0037771 A1 | 2/2015 | Kaleal, III et al. |
| 2015/0042468 A1 | 2/2015 | White et al. |
| 2015/0057945 A1 | 2/2015 | White et al. |
| 2015/0113417 A1 | 4/2015 | Yuen et al. |
| 2015/0119198 A1 | 4/2015 | Wisbey et al. |
| 2015/0119728 A1 | 4/2015 | Blackadar et al. |
| 2015/0127966 A1 | 5/2015 | Ma et al. |
| 2015/0141873 A1 | 5/2015 | Fei |
| 2015/0160026 A1 | 6/2015 | Kitchel |
| 2015/0180842 A1 | 6/2015 | Panther |
| 2015/0185815 A1* | 7/2015 | DeBates ............. G06F 1/3209 713/320 |
| 2015/0209615 A1 | 7/2015 | Edwards |
| 2015/0233595 A1 | 8/2015 | Fadell et al. |
| 2015/0272483 A1 | 10/2015 | Etemad et al. |
| 2015/0312857 A1 | 10/2015 | Kim et al. |
| 2015/0326709 A1 | 11/2015 | Pennanen et al. |
| 2015/0335978 A1 | 11/2015 | Syed et al. |
| 2015/0342533 A1 | 12/2015 | Kelner |
| 2015/0347983 A1 | 12/2015 | Jon et al. |
| 2015/0350822 A1 | 12/2015 | Xiao et al. |
| 2015/0362519 A1 | 12/2015 | Balakrishnan et al. |
| 2015/0374279 A1 | 12/2015 | Takakura et al. |
| 2015/0382150 A1 | 12/2015 | Ansermet et al. |
| 2016/0007288 A1 | 1/2016 | Samardzija et al. |
| 2016/0007934 A1 | 1/2016 | Arnold et al. |
| 2016/0023043 A1 | 1/2016 | Grundy |
| 2016/0026236 A1 | 1/2016 | Vasistha et al. |
| 2016/0034043 A1 | 2/2016 | Le Grand et al. |
| 2016/0034133 A1 | 2/2016 | Wilson et al. |
| 2016/0041593 A1 | 2/2016 | Dharawat |
| 2016/0058367 A1 | 3/2016 | Raghuram et al. |
| 2016/0058372 A1 | 3/2016 | Raghuram et al. |
| 2016/0059079 A1 | 3/2016 | Watterson |
| 2016/0072557 A1 | 3/2016 | Ahola |
| 2016/0081028 A1 | 3/2016 | Chang et al. |
| 2016/0081625 A1 | 3/2016 | Kim et al. |
| 2016/0084869 A1 | 3/2016 | Yuen et al. |
| 2016/0091980 A1 | 3/2016 | Baranski et al. |
| 2016/0104377 A1* | 4/2016 | French ............. G08G 1/0129 701/117 |
| 2016/0135698 A1 | 5/2016 | Baxi et al. |
| 2016/0143579 A1 | 5/2016 | Martikka et al. |
| 2016/0144236 A1 | 5/2016 | Ko et al. |
| 2016/0148396 A1 | 5/2016 | Bayne et al. |
| 2016/0148615 A1 | 5/2016 | Lee et al. |
| 2016/0184686 A1 | 6/2016 | Sampathkumaran |
| 2016/0209907 A1 | 7/2016 | Han et al. |
| 2016/0226945 A1 | 8/2016 | Granqvist et al. |
| 2016/0259495 A1 | 9/2016 | Butcher et al. |
| 2016/0317097 A1 | 11/2016 | Adams et al. |
| 2016/0327915 A1 | 11/2016 | Katzer et al. |
| 2016/0328991 A1 | 11/2016 | Simpson et al. |
| 2016/0346611 A1* | 12/2016 | Rowley ............. A61B 5/1112 |
| 2016/0374566 A1 | 12/2016 | Fung et al. |
| 2016/0379547 A1 | 12/2016 | Okada |
| 2017/0010677 A1 | 1/2017 | Roh et al. |
| 2017/0011089 A1 | 1/2017 | Bermudez et al. |
| 2017/0011210 A1 | 1/2017 | Cheong et al. |
| 2017/0032256 A1 | 2/2017 | Otto et al. |
| 2017/0038740 A1 | 2/2017 | Knappe et al. |
| 2017/0063475 A1 | 3/2017 | Feng |
| 2017/0065230 A1 | 3/2017 | Sinha et al. |
| 2017/0087431 A1 | 3/2017 | Syed et al. |
| 2017/0124517 A1 | 5/2017 | Martin |
| 2017/0153119 A1 | 6/2017 | Nieminen et al. |
| 2017/0153693 A1 | 6/2017 | Duale et al. |
| 2017/0154270 A1 | 6/2017 | Lindman et al. |
| 2017/0168555 A1 | 6/2017 | Munoz et al. |
| 2017/0173391 A1 | 6/2017 | Wiebe et al. |
| 2017/0232294 A1 | 8/2017 | Kruger et al. |
| 2017/0262699 A1 | 9/2017 | White et al. |
| 2017/0266494 A1* | 9/2017 | Crankson ............. A63B 24/0062 |
| 2017/0316182 A1 | 11/2017 | Blackadar et al. |
| 2018/0015329 A1 | 1/2018 | Burich et al. |
| 2018/0108323 A1 | 4/2018 | Lindman et al. |
| 2018/0193695 A1 | 7/2018 | Lee |
| 2018/0345077 A1 | 12/2018 | Blahnik et al. |
| 2019/0025928 A1 | 1/2019 | Pantelopoulos et al. |
| 2019/0056777 A1 | 2/2019 | Munoz et al. |

FOREIGN PATENT DOCUMENTS

| | | |
|---|---|---|
| CN | 102495756 A | 6/2012 |
| CN | 103309428 A | 9/2013 |
| CN | 103631359 A | 3/2014 |
| CN | 204121706 U | 1/2015 |
| CN | 104680046 A | 6/2015 |
| CN | 105242779 A1 | 1/2016 |
| CN | 106062661 A | 10/2016 |
| CN | 106604369 A | 4/2017 |
| CN | 108052272 A | 5/2018 |
| CN | 103154954 B | 6/2018 |
| CN | 108377264 A | 8/2018 |
| CN | 108983873 A | 12/2018 |
| EP | 1755098 A2 | 2/2007 |
| EP | 2096820 A1 | 9/2009 |
| EP | 2107837 A1 | 10/2009 |
| EP | 2172249 A2 | 4/2010 |
| EP | 2770454 A1 | 8/2014 |
| EP | 2703945 A2 | 3/2015 |
| EP | 2849473 A1 | 3/2015 |
| EP | 2910901 A1 | 8/2015 |
| EP | 3023859 A1 | 5/2016 |
| EP | 3361370 A | 8/2018 |
| FI | 126911 B | 2/2017 |
| GB | 2425180 A | 10/2006 |
| GB | 2513585 A | 11/2014 |
| GB | 2530196 A | 3/2016 |
| GB | 2537423 A | 10/2016 |
| GB | 2541234 A | 2/2017 |
| GB | 2555107 A | 4/2018 |
| KR | 20110070049 A | 6/2011 |
| KR | 101500662 B1 | 3/2015 |
| SE | 528295 C2 | 10/2006 |
| TW | 201706840 A | 2/2017 |
| TW | I598076 A | 9/2018 |
| WO | WO02054157 A1 | 7/2002 |
| WO | WO2010083562 A1 | 7/2010 |
| WO | WO2010144720 A1 | 12/2010 |
| WO | WO2011061412 A1 | 5/2011 |
| WO | WO2011123932 A1 | 10/2011 |
| WO | WO2012037637 A1 | 3/2012 |
| WO | WO2012115943 A1 | 8/2012 |
| WO | WO2012141827 A2 | 10/2012 |
| WO | WO2013091135 A1 | 6/2013 |
| WO | WO2013121325 A2 | 8/2013 |
| WO | WO2014118767 A1 | 8/2014 |
| WO | WO2014144258 A2 | 9/2014 |
| WO | WO2014193672 A1 | 12/2014 |
| WO | WO2014209697 A1 | 12/2014 |
| WO | WO2014182162 A3 | 6/2015 |
| WO | WO2015087164 A1 | 6/2015 |
| WO | WO2015131065 A1 | 9/2015 |
| WO | WO2016022203 A1 | 2/2016 |
| WO | WO2017011818 A1 | 1/2017 |

(56) References Cited

FOREIGN PATENT DOCUMENTS

WO     WO2018217348 A1    11/2018
WO     WO2018222936 A1    12/2018

OTHER PUBLICATIONS

ARM big. Little. Wikipedia, The free encyclopedia, Oct. 11, 2018, Retrieved on May 28, 2020 from: <https://en.wikipedia.org/w/index.php?title=ARM_bit.LITTLE&oldid=863559211> foreword on p.1, section "Run-state migration" on pp. 1-2.

Qualcomm Snapdragon Wear 3100 Platform Supports New Ultra-Low Power System Architecture For Next Generation Smartwatches. Qualcomm Technologies, Inc., Sep. 10, 2018, Retrieved on May 28, 2020 from: <https://www.qualcomm.com/news/releases/2018/09/10/qualcomm-snapdragon-wear-3100-platform-supports-new-ultra-low-power-system> sections "Snapdragon Wear 3100 Based Smartwatches Aim to Enrich the User Experience" on pp. 3-4.

CNET: Dec. 11, 2017, "Apple watch can now sync with a treadmill", youtube.com, [online], Available from: https://www.youtube.com/watch?v=7RvMC3wFDME [ Accessed Nov. 19, 2020].

CASH: A guide to GPS and route plotting for cyclists. 2018. www.cyclinguk.org/article/guide-gps-and-route-plotting-cyclists.

\* cited by examiner

US 11,137,820 B2

APPARATUS AND METHOD FOR PRESENTING THEMATIC MAPS

RELATED APPLICATIONS

This application is a continuation-in-part of U.S. patent application Ser. No. 16/377,267 filed on Apr. 8, 2019, which is a continuation-in-part of U.S. patent application Ser. No. 15/365,972 filed on Dec. 1, 2016, which claims priority from both the Finnish patent application No. 20155906 filed on Dec. 1, 2015 and the British patent application No. 1521192.3 filed on Dec. 1, 2015, and U.S. patent application Ser. No. 15/784,234 filed on Oct. 16, 2017, which claims priority from both the Finnish patent application No. 20165790 filed on Oct. 17, 2016 and the British patent application No. 1617575.4 filed on Oct. 17, 2016. The subject matter of these is incorporated by reference in their entirety.

FIELD OF INVENTION

The present invention in general relates, for example, to device usability in multi-core or multi-chip embedded solutions.

BACKGROUND OF INVENTION

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network. The embedded device may be enabled to receive from such a communications network information relating to, for example, a current time and current time zone.

More complex embedded devices, such as cellular telephones, may allow a user to install applications into a memory, such as, for example, a solid-state memory, comprised in the device. Embedded devices are frequently resource-constrained when compared to desktop or laptop computers. For example, memory capacity may be more limited than in desktop or laptop computers, processor computational capacity may be lower and energy may be available from a battery. The battery, which may be small, may be rechargeable.

Conserving battery power is a key task in designing embedded devices. A lower current usage enables longer time intervals in-between battery charging. For example, smartphones benefit greatly when they can survive an entire day before needing recharging, since users are thereby enabled to recharge their phones overnight, and enjoy uninterrupted use during the day.

Battery resources may be conserved by throttling a processor clock frequency between a maximum clock frequency and a lower clock frequency, for example one half of the maximum clock frequency. Another way to conserve battery power is to cause a display of an embedded device to switch itself off then the device is not used, since displaying content on a display consumes energy in order to cause the display to emit light that humans can see.

SUMMARY OF THE INVENTION

The invention is defined by the features of the independent claims. Some specific embodiments are defined in the dependent claims.

According to a first aspect of the present invention, there is provided an apparatus, such as a personal device, comprising at least one processor with at least one processing core, at least one display, at least one sensor, at least one memory including a computer program code, the at least one memory and the computer program code being configured to, with the at least one processing core, cause the apparatus at least to:

determine the location of the apparatus by means of a sensor providing location information to said at least one processing core;

transmit from said apparatus a query to a thematic map database server, the query comprising an indication of the current location of the apparatus;

update said apparatus with thematic maps related to said location from said server by downloading thematic map data and storing the thematic map data in said at least one memory of said apparatus;

present to a user of said apparatus on a display in a first display mode on said at least one display at least one downloaded thematic map as one of a suggested activity;

selecting an activity session based on at least one of the following criteria: user selection input, a pre-recorded user preference, user activity history, intensity of activities in said location, special activities in said location, time of the day, time of the year, the location of said activity or a second location adjacent to said present location, and performing in a sequence:

a) initiating a selected activity and displaying to the user by a first processing core in said first display mode performance-related information relating to physical performance of said user in said activity;

b) entering a first power-save mode by switching from said first display mode to a second display mode displaying to the user at least the time and a thematic map with reduced functionality relating to said activity, c) entering a second power-save mode by putting said at least one processing core in a hibernating mode; and d) entering a third display mode where a clock unit updates said display in predefined time intervals at least with the time and at least one item of pre-calculated information selected from the following: a static thematic map relating to said activity and the current time, date, moon phase, tide, sun position.

In a second aspect of the invention, a method is provided for for presenting information to a user of an apparatus, such as a personal device, said device comprising at least one processor having at least on processing core, at least one display, at least one sensor and at least one memory including computer program code, said method comprising the steps of:

determining the location of the apparatus by means of a sensor providing location information to said at least one processing core;

transmitting from said apparatus a query to a thematic map database server, the query comprising an indication of the current location of the apparatus;

updating said apparatus with thematic maps related to said location from said server by downloading thematic map data and storing the thematic map data in said at least one memory of said apparatus;

presenting to the user in a first display mode on said at least one display at least one downloaded thematic map as one of a suggested activity;

selecting an activity session based on at least one of the following criteria: user selection input, a pre-recorded user preference, user activity history, intensity of activities in said location, special activities in said location, time of the day, time of the year, the location of said activity or a second location adjacent to said present location, and performing in a sequence:

a) initiating a selected activity and displaying to the user in said first display mode performance-related information relating to physical performance of said user in said activity;

b) entering a first power-save mode by switching from said first display mode to a second display mode displaying to the user at least the time and a thematic map with reduced functionality relating to said activity, c) entering a second power-save mode by putting said at least one processing core in a hibernating mode; and d) entering a third display mode where a clock unit updates said display in predefined time intervals at least with the time and at least one item of pre-calculated information selected from the following: a static thematic map relating to said activity and the current time, date, moon phase, tide, sun position.

In some embodiments, at least two processing cores are provided, wherein a selected activity is initiated by a first processing core in said first display mode, said first power-save mode is entered by putting said first processing core in a hibernating mode and by switching to said second display mode using a second processing core, and said second power-save mode is entered by putting said second processing core in a hibernating mode.

In some embodiments, the clock unit is a Real Time Clock (RTC) unit which updates said display in said second power-save mode in predefined time intervals with reduced thematic maps stored in said at least one memory of the apparatus, wherein said reduced thematic map to be shown is selected based on the current time as registered by said RTC unit Various embodiments of the first aspect may comprise at least one feature from the following bulleted list:

the performed sequence in order a) to c) is reversed in order c) to a) based on at least one of the following criteria: user selection input or acceleration data input from an acceleration sensor in said apparatus indicating a display reading posture of said user;

the apparatus is configured to present to the user as one activity type a selection of updated thematic heatmaps created for different sports activities in said location;

the apparatus is configured to present to the user as one activity type a selection of updated thematic heatmaps created for different sports activities in second locations outside but adjacent to said present location;

the apparatus is configured to automatically update thematic maps related to said location from said thematic map database server when the apparatus is being charged and is connected to a wireless network with coverage in said present location;

the updated thematic maps are stored in said at least one memory of said apparatus for the offline use of said heatmaps in said activity sessions;

the thematic maps with reduced functionality are pre-calculated by said first processing core and stored in said at least one memory of said apparatus to be displayed to the user in said second display mode by said second processing core; and the thematic maps with reduced functionality are pre-calculated by said second processing core and stored in said at least one memory of said apparatus to be displayed to the user in said second display mode by said second processing core.

DETAILED DESCRIPTION OF EXAMPLE EMBODIMENTS

A thematic map database, for example a heat map, may be compiled to cover a geographic area. Users may engage in activity sessions while in the geographic area. Activity types of such activity sessions may include jogging, swimming and cycling, for example. When a user wishes to engage in an activity session of his own, his device may determine a route for this activity session based at least in part on the thematic map database. Determining the route may comprise designing the route, optionally based partly on user settings, based on where other users have engaged in activity sessions of the same type in the past. For example, a jogging route may be determined based, at least partly, on indications where other users have jogged in the past. Route determination may be partly based on further considerations as well, as will be laid out below.

Figure 1A:
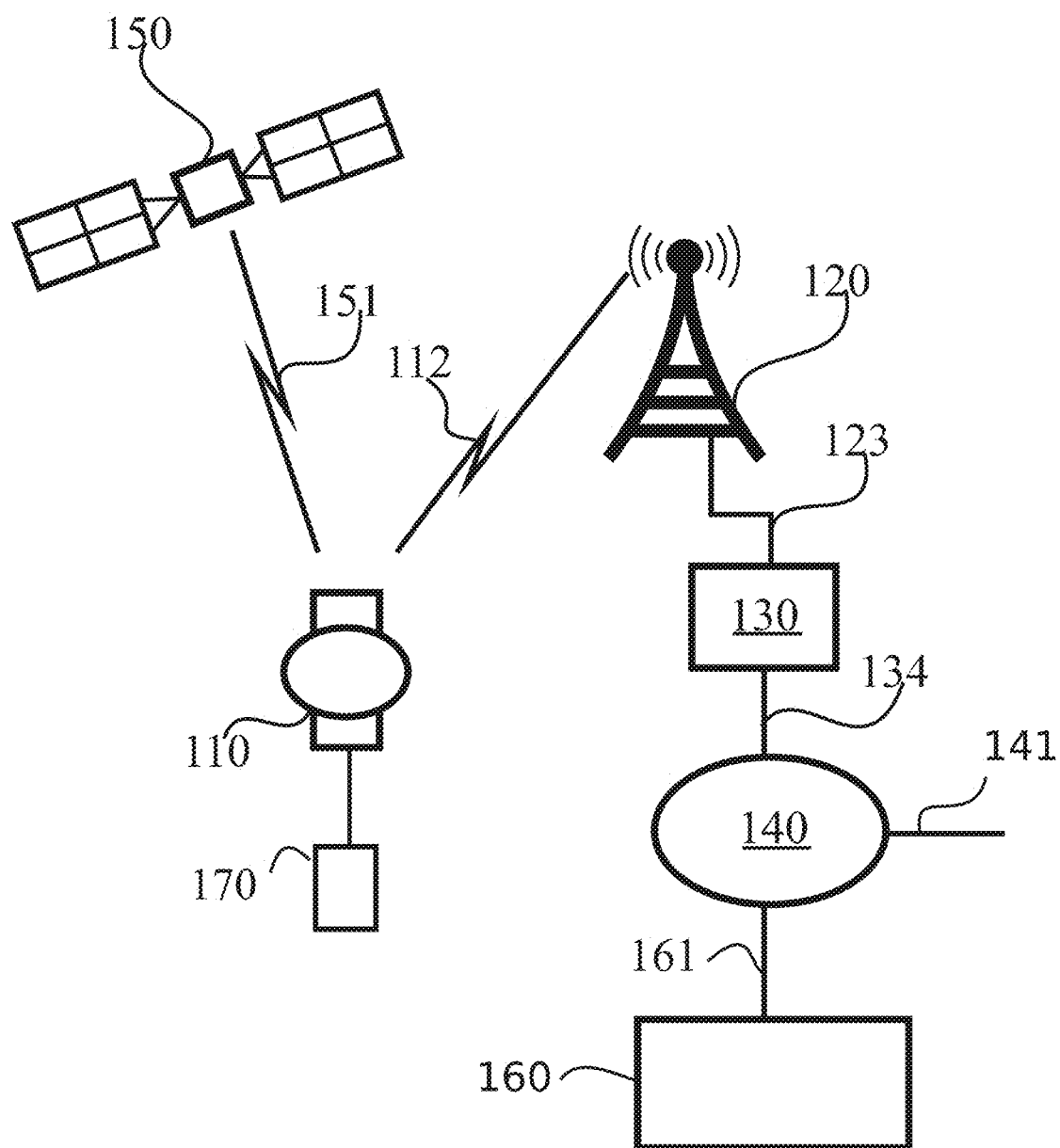
FIG. 1A illustrates a system in accordance with at least some embodiments of the present invention.

FIG. 1A illustrates a system in accordance with at least some embodiments of the present invention. The system comprises device 110, which may comprise, for example, a smart watch, digital watch, smartphone, phablet device, tablet device, or another type of suitable device. Device 110 comprises a display, which may comprise a touchscreen display, for example. The display may be limited in size. Device 110 may be powered, for example, by a rechargeable battery. An example of a limited-size display is a display worn on a wrist.

Device 110 may be communicatively coupled with a communications network. For example, in FIG. 1A device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120.

Device 110 may be configured to receive, from satellite constellation 150, satellite positioning information via satellite link 151. The satellite constellation may comprise, for example the global positioning system, GPS, or the Galileo constellation. Satellite constellation 150 may comprise more than one satellite, although only one satellite is illustrated in FIG. 1A for the same of clarity. Likewise, receiving the positioning information over satellite link 151 may comprise receiving data from more than one satellite.

Alternatively or additionally to receiving data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible or ongoing. Likewise a non-cellular base station, or access point, may know its own location and provide it to device 110, enabling device 110 to position itself within communication range of this access point.

Device 110 may be configured to obtain a current time from satellite constellation 150, base station 120 or by requesting it from a user, for example. Once device 110 has the current time and an estimate of its location, device 110 may consult a look-up table, for example, to determine a time remaining until sunset or sunrise, for example. Device 110 may likewise gain knowledge of the time of year.

Network 140 may be coupled to a database server 160 via a connection 161, or the further network connection 141. When device 110 apparatus has determined the present location of itself it may transmit a query to database server 160 acting as a thematic map database server. The query may comprise an indication of the current location of the apparatus obtained by, for example, a global positioning system as explained above. Updated thematic map data related to the present location of the device 110 may then be downloaded from the server 160 over network connections 161 or 141 and stored in a memory of the device 110.

The device may be configured to present to the user a selection of updated thematic maps as heatmaps created for different sports activities in said location. The updated heatmaps thus stored in the memory of the device 110 may be used offline in activity sessions.

Device 110 may be configured to provide an activity session. An activity session may be associated with an activity type. Examples of activity types include rowing, paddling, cycling, jogging, walking, hunting and paragliding. In a simplest form, an activity session may comprise device 110 displaying a map of the surroundings, and a route on the map that relates to the activity session. Device 110 may be configured to display, on the route, an indication where along the route the user is currently located, enabling the user to see the place along the route where his jog, for example, is at the moment progressing.

According to some embodiments, the device 110 may be configured to present to the user a selection of updated thematic maps as heatmaps created for different sports activities in second locations outside but adjacent to said present location. Some activities preferred by the user, such as cycling for example, may involve moving long distances and/or for a lengthy time. In the planning of such activities it may be beneficial to have heatmaps also covering locations nearby the present one.

In some embodiments the apparatus may be configured to automatically update thematic maps from the server 160 when the apparatus is being charged with a charging device 170 and is connected to a wireless network 112.

According to some embodiments, the device 110 may first be able to determine the present location of the device, to transmit a query to a thematic map database server, the query comprising an indication of the current location of the device, and then to update itself with thematic maps related to its location by downloading thematic map data from the server and store the thematic map data in the memory of the device 110. Then, the device may present to the user on the display in a first display mode a selection of downloaded thematic maps as suggested activity types. The selection may be based on at least one of the criteria of a pre-recorded user preference, user activity history, intensity of activities in said location, special activities in said location, time of the day, time of the year, or a second location adjacent to said present location. In response to a user selection input, the device 110 may then initiate an activity session of one of the activity being selected, and display a thematic map of the activity in a second display mode.

Processing heatmaps, sensor information, displays and other hardware required for tracking the whereabouts and physical performance of a person is a power-consuming task. From a battery performance point of view, it is important to minimize the energy consumption of the device 110. Therefore, a first display mode has been envisaged, where all relevant data and features required for the user to perform searching, browsing and a selection of activities, as well as using any other features offered by the device. This requires much battery power, but once the activity selection is made and initiated, the device 110 may enter a low-power mode focusing only on processing data which is essential for the activity in question. Such a low-power mode may involve the use of a second display mode, where for example, resolution is reduced, colours are not displayed, map display is simplified and/or sensors are shut off and their corresponding information is suppressed on the display.

According to some embodiments, the apparatus comprises at least two processing cores, at least one display with at least two display modes. A first processing core causes the apparatus to determine the present location of the apparatus, transmit from the apparatus a query to a thematic map database server, and to update the apparatus with thematic maps related to said location from said server by downloading thematic map data and storing the thematic map data in at least one memory of the apparatus. It also presents to the user on the display in a first display mode a selection of downloaded thematic maps as suggested activity types, where the activity types are based on at least one of the following criteria: a pre-recorded user preference, user activity history, intensity of activities in said location, special activities in said location, time of the day, time of the year, or a second location adjacent to said present location. In response to a user selection input, an activity session is initiated and a thematic map of the selected activity is displayed in a second display mode by a second processing core.

In some embodiments, updated thematic heatmaps may be created for different sports activities also in second locations outside, but adjacent to the present location. This may be beneficial if the activity, such as cycling, takes place over considerable distances. The device 110 may be configured to automatically update thematic maps related to its location from a thematic map database server anytime when the apparatus is being charged and is connected to a wireless network with coverage of its present location.

In some embodiments, the updated thematic maps are stored in a memory of the device 110 for offline use. Thus a stored thematic map of an activity session that is to be initiated may be displayed directly in a second display mode.

An activity session in device 110 may enhance a utility a user can obtain from the activity, for example, where the activity involves movement outdoors, the activity session may provide a recording of the activity session. An activity session in device 110 may, in some embodiments, provide the user with contextual information during the activity session. Such contextual information may comprise, for example, locally relevant weather information, received via base station 120, for example. Such contextual information may comprise at least one of the following: a rain warning, a temperature warning, an indication of time remaining before sunset, an indication of a nearby service that is relevant to the activity, a security warning, an indication of nearby users and an indication of a nearby location where several other users have taken photographs. Where the contextual information comprises a security warning, the warning may comprise a security route, determined in a way that enables the user to avoid danger. For example, in case of a chemical leak, the security route may comprise a route that leads indoors or to public transport. The device 110 may determine a security route, or the device 110 may receive the security route, at least in part, from a network. The security route may be determined using existing roads, pathways and other transit routes that are known to the entity determining the security route. Transit routes may be known from a public mapping service, for example.

A recording may comprise information on at least one of the following: a route taken during the activity session, a metabolic rate or metabolic effect of the activity session, a time the activity session lasted, a quantity of energy consumed during the activity session, a sound recording obtained during the activity session and an elevation map along the length of the route taken during the activity session. A route may be determined based on positioning information, for example. Metabolic effect and consumed energy may be determined, at least partly, based on information concerning the user that device 110 has access to. A recording may be stored in device 110, an auxiliary device, or in a server or data cloud storage service. A recording stored in a server or cloud may be encrypted prior to transmission to the server or cloud, to protect privacy of the user.

An activity session may have access to a backhaul communications link to provide indications relating to the ongoing activity. For example, search and rescue services may be given access to information on joggers in a certain area of a forest, to enable their rescue if a chemical leak, for example, makes the forest unsafe for humans. In some embodiments, routes relating to activity sessions are provided to a cloud service for storage when the activity sessions start, to enable searching for missing persons along the route the persons were planning to take.

The user may initiate an activity session by interacting with a user interface of device 110, for example. Where device 110 has s small form factor, the user interface may be implemented over a limited user interaction capability, such as, for example, a small screen, small touchscreen, and/or limited number of push buttons. A limited user interaction capability may make it arduous for the user to perform complicated interactions with device 110, which makes it less likely the user will choose to interact with device 110. Therefore, it is of interest to simplify the interaction between device 110 and the user, to make it easier for the user to complete the interaction, and thus more likely the user will perform the interaction.

Device 110 may provide to the thematic map database 160 an indication relating to the activity session, to enhance the thematic map database further. Such indications may be anonymized prior to sending to the database, both to protect the user's privacy and/or to comply with local legislation. Such indications may comprise, for example, information on a determined route and a corresponding activity type.

In general, a thematic map database 160 may associate at least one form of data with a geographic location. For example, the thematic map database may associate past indications of activity sessions with geographic locations, for example to enable mapping areas where activity sessions of a given activity type have been performed. Areas may be mapped as to the intensity, or frequency, of past indications of activity session and type. Thus a first area of a lake may be associated with frequent rowing, and another area of the same lake with less frequent, but still non-zero, rowing. Such a frequency may be referred to as intensity, and the thematic map database may, in general, associate activity type intensities with locations. Alternatively to intensities, the thematic map database may simply associate, whether an activity session of a given activity type has in the past been performed in a geographic location. Alternatively to intensities, the thematic map database may indicate any specialities of activities in the location. Additionally or alternatively, a traffic density may be associated with the geographic locations. Traffic density may comprise pedestrian or vehicular traffic density, for example. Walking or jogging may be less pleasant, or less healthy, in areas with a high vehicular traffic density due to exhaust fumes, wherefore a route relating to an activity session with such type may be determined in a way that avoids such high-traffic density areas. Likewise, additionally or alternatively, crime density may be mapped, and employed in route determination to avoid high-crime areas. Avalanche risk density, obtained from meteorological services, may similarly be used to route ski activity sessions in safe areas. In some embodiments, places where many users have taken photographs may be used in routing, such that routes are determined to visit frequently photographed locations, since such locations are likely to be beautiful and inspiring.

In some embodiments, the user may have indicated in user settings that he wishes to engage in a certain type of activity session, wherein such indications may be taken into account when determining the route for the activity session. The settings may be taken into account, for example, by designing the route so that performing the activity session along the route causes an increase in energy consumption in the user that is approximately in line with what the user has requested in the settings. Alternatively or additionally, a cardiovascular effect of the activity session may be tuned to be in line with a user setting by designing the route in a suitable way. Likewise the user may specify a desired effect on oxygen consumption, EPOC effect and/or a recovery time length after the activity session. EPOC refers to excess post-exercise oxygen consumption, sometimes known colloquially as afterburn.

A route may be determined to be able to be interrupted. For example, where the activity comprises cycling, the route may come close to the starting and ending location close to a midpoint of the route, to enable the user to cut the route short. The user may specify in user settings he wishes to engage in an interruptable route, or interruptability may be a default setting that is attempted to comply with, where possible.

A level of physical exertion, in terms of energy consumption, oxygen consumption, cardiovascular effect, EPOC or recovery time length, the route causes in the user may be modified by determining elevation changes along the route. Where the user wishes a light activity session, the route may be determined as relatively flat, and where the user wishes for a strenuous activity session, the route may be determined in a way that it has more elevation changes. Using the thematic map database in connection with elevation data in this sense may comprise, for example, determining the route based on elevation changes to match the desired strenuousness, in an area which the thematic map database indicates that activity sessions of a corresponding type have been conducted in the past. In general, the user settings may be employed in determining the route after a suitable area for the route has been identifier using the thematic map database.

A time of year and/or a time of day may be employed in either the thematic map database or in the determining of the route. For example, the thematic map database 160 may comprise data collected at different times of year, for example a same location may be associated with frequent jogging in summertime and frequent skiing during the winter months. Thus, the database may return a jogging route in the location in case the query is made in the summer, and the database may return a skiing route in the location in case the query is made in the winter. Alternatively or in addition, device 110 may select activity types consistent with the time of year, or time of day, from the set of activity types returned from the database when determining the predicted user activity type. Device 110 may perform this task in embodiments where a thematic map database doesn't collect statistics separately according to time of year or day, for example. As a specific example, local residents may consider a certain location as safe during the day but unsafe after dark. In such a situation, a user requesting a jogging route could be routed to this location if the request is made in the daytime, but routed elsewhere if the request is made after dark.

In general, the thematic map database 160 may be comprised in a server or cloud device, or it may be downloaded, at least in part, to device 110 or an auxiliary device, for offline use. An auxiliary device is described below in connection with FIG. 1B. While described herein primarily as a route determination method performed by device 110, in various embodiments of the invention the route determination may take place in another device, such as the auxiliary device or a cloud computing device, for example. The user may have an account in a cloud computing service, where his information may be stored and he may request for a route to be determined and furnished to his device, such as, for example, device 110.

Responsive to the user approving, implicitly or explicitly, a suggested route, an activity session based on the approved suggested route may be initiated.

More than one route may be determined, such that at least one of the determined routes is presented to the user as a suggested route. For example, two routes may be determined that match requirements defined by the user, and these two routes may then be presented as suggested routes, with information concerning each route presented to the user as well. For example, energy consumption, estimated time to completion and/or length of a route may be presented to assist the user in making a selection. Energy consumption, estimated time to completion and/or other suitable information may be determined, at least partly, on the elevation information.

Information may be presented also, or alternatively, concerning segments of any suggested route, to enable the user to construct his route from interconnected segments.

In some embodiments, the user needn't explicitly select a suggested route, rather, the device may deduce from the way positioning information changes, which route the user is following. As a response, any other suggested routes may be removed from the display to reduce clutter. In case the user deviates from the route, the device may notice this from the positioning information, and responsively determine an alternative route for the user, which may again be displayed. Thus movement of the user may cause, via the positioning information, an approval of a suggested route and/or a new determination of a new suggested route in case of deviation from a previously approved route. Such a new suggested route may be determined from the current location of the device to the same end point as the originally approved route. Such an end point may comprise the start point of the route, or, alternatively, another point input by the user. Remaining time, energy consumption and/or other information may be presented concerning the new suggested route.

Figure 1B:
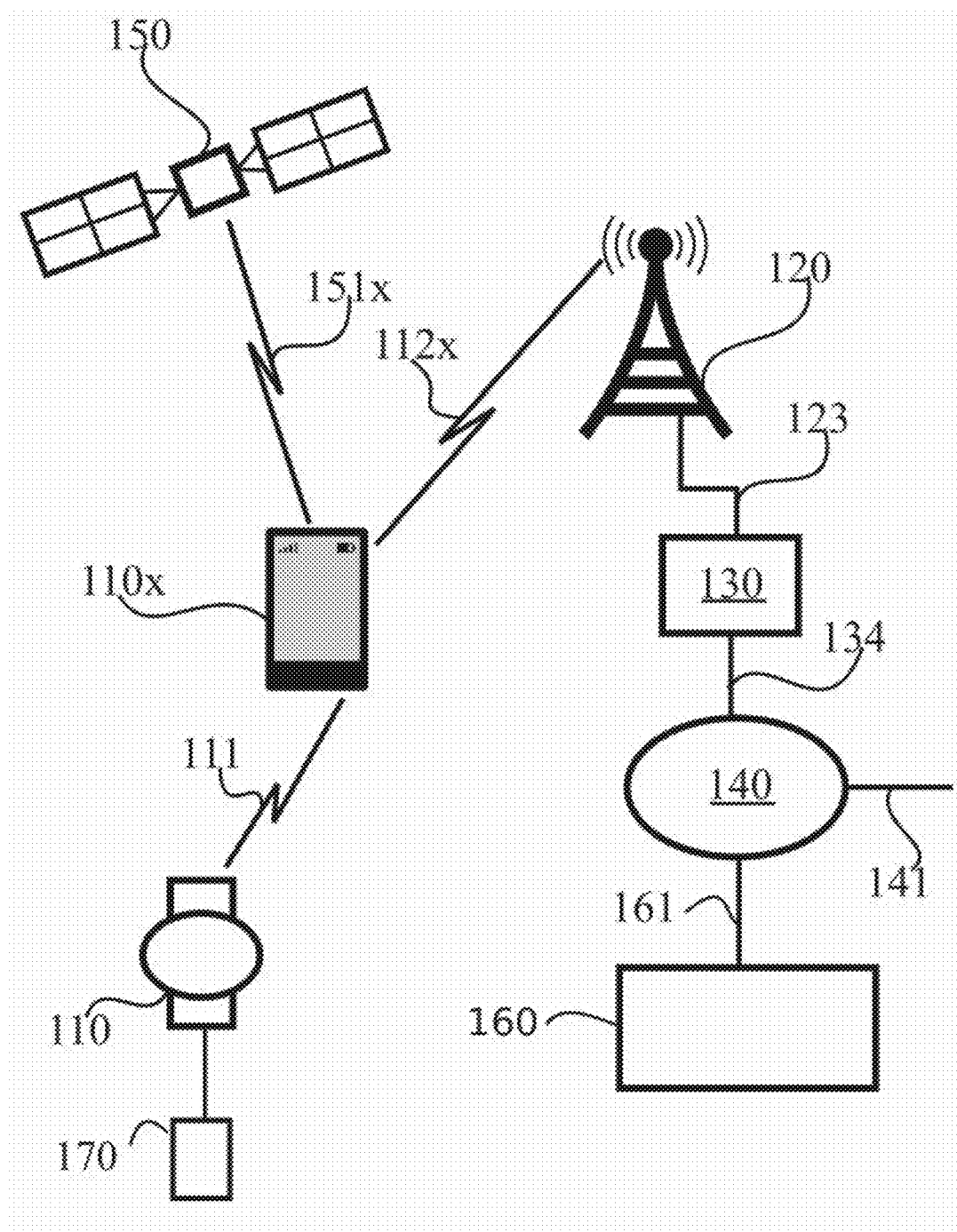
FIG. 1B illustrates a system in accordance with at least some embodiments of the present invention.

FIG. 1B illustrates a system in accordance with at least some embodiments of the present invention. Like numbering denotes like structure as in FIG. 1A. FIG. 1B embodiments comprise an auxiliary device 110*x*.

Device 110 may be communicatively coupled, for example communicatively paired, with an auxiliary device 110*x*. The communicative coupling, or pairing, is illustrated in FIG. 1A as interface 111, which may be wireless, as illustrated, or wire-line, depending on the embodiment. Auxiliary device 110*x* may comprise a smartphone, tablet computer or other computing device, for example. Auxiliary device 110*x* may comprise a device that the owner of device 110 uses to consume media, communicate or interact with applications. Auxiliary device 110*x* may be furnished with a larger display screen than device 110, which may make auxiliary device 110*x* preferable to the user when a complex interaction with an application is needed, as a larger screen enables a more detailed rendering of interaction options. In some embodiments, such as those illustrated in FIG. 1A, auxiliary device 110*x* is absent.

In some embodiments, where an auxiliary device 100*x* is present, device 110 is configured to use connectivity capability of auxiliary device 110x. For example, device 110 may access a network via auxiliary device 110x. In these embodiments, device 110 need not be furnished with connectivity toward base station 120, for example, since device 110 may access network resources via interface 111 and a connection auxiliary device 110x has with base station 120. Such a connection is illustrated in FIG. 1B as connection 112x. For example, device 110 may comprise a smart watch and auxiliary device 110x may comprise a smartphone, which may have connectivity to cellular and/or non-cellular data networks. Likewise, in some embodiments device 110 may receive satellite positioning information, or positioning information derived therefrom, via auxiliary device 110x where device 110 lacks a satellite positioning receiver of its own. A satellite connection of auxiliary device 151x is illustrated in FIG. 1B as connection 151X.

In some embodiments, device 110 may have some connectivity and be configured to use both that and connectivity provided by auxiliary device 110x. For example, device 110 may comprise a satellite receiver enabling device 110 to obtain satellite positioning information directly from satellite constellation 150. Device 110 may then obtain network connectivity to base station 120 via auxiliary device 110x. For example, device 110 may transmit a query to the thematic map database via auxiliary device 110x. In some embodiments, device 110 is configured to request, and responsively to receive, sensor information from auxiliary device 110x. Such sensor information may comprise acceleration sensor information, for example. In general, processing, such as route determination and/or communication processing, may be distributed in a suitable way between device 110, auxiliary device 110x and/or a cloud computing service.

Similarly as discussed in connection with FIG. 1A, network 140 may be coupled to a thematic map database server 160 via an auxiliary device 110x and a connection 161, for example. Updated thematic map data related to the present location of the device 110 may be downloaded from the server 160 and stored in a memory of the device 110, or in a memory of the auxiliary device 110x. The device 110 may be configured to automatically update thematic maps from the server 160 when the apparatus is being charged with a charging device 170 and is connected to a wireless network 112, either directly or via the auxiliary device 110x.

Furnishing an embedded device with two or more processor cores, at least some of which are enabled to control the display of the device, makes possible power savings where a less-capable processor core is configured to toggle a more capable processor core to and from a hibernation state. A hibernation state may comprise that a clock frequency of the more capable processing core is set to zero, for example. In a hibernation state, in addition to, or alternatively to, setting the clock frequency of the more capable processing core to zero, a memory refresh rate of memory used by the more capable core may be set to zero. Alternatively to zero, a low non-zero frequency may be used for the clock frequency and/or the memory refresh frequency. In some embodiments, a more capable processing core may employ a higher-density memory technology, such as double data rate, DDR, memory, and a less capable processing core may employ a lower-density memory technology, such as static random access memory, SRAM, memory. In a hibernation state the hibernated processing core, or more generally processing unit, may be powered off. Alternatively to a processor core, an entire processor may, in some embodiments, be transitioned to a hibernation state. An advantage of hibernating an entire processor is that circuitry in the processor outside the core is also hibernated, further reducing current consumption.

Device 110 may comprise two or more processing units. The two or more processing units may each comprise a processing core. Each processing unit may comprise one or multiple uniformal or heterogeneous processor cores and/or different volatile and non-volatile memories. For example, device 110 may comprise a microprocessor with at least one processing core, and a microcontroller with at least one processing core. The processing cores needn't be of the same type, for example, a processing core in a microcontroller may have more limited processing capability and/or a less capable memory technology than a processing core comprised in a microprocessor. In some embodiments, a single integrated circuit comprises two processing cores, a first one of which has lesser processing capability and consumes less power, and a second one of which has greater processing capability and consumes more power. In general a first one of the two processing units may have lesser processing capability and consume less power, and a second one of the two processing units may have greater processing capability and consume more power. Each of the processing units may be enabled to control the display of device 110. The more capable processing unit may be configured to provide a richer visual experience via the display. The less capable processing unit may be configured to provide a reduced visual experience via the display. An example of a reduced visual experience is a reduced colour display mode, as opposed to a rich colour display mode. An another example of a reduced visual experience is one which is black-and-white. An example of a richer visual experience is one which uses colours. Colours may be represented with 16 bits or 24 bits, for example.

Each of the two processing units may comprise a display interface configured to communicate toward the display. For example, where the processing units comprise a microprocessor and a microcontroller, the microprocessor may comprise transceiver circuitry coupled to at least one metallic pin under the microprocessor, the at least one metallic pin being electrically coupled to an input interface of a display control device. The display control device, which may be comprised in the display, is configured to cause the display to display information in dependence of electrical signals received in the display control device. Likewise the microcontroller in this example may comprise transceiver circuitry coupled to at least one metallic pin under the microcontroller, the at least one metallic pin being electrically coupled to an input interface of a display control device. The display control device may comprise two input interfaces, one coupled to each of the two processing units, or alternatively the display control device may comprise a single input interface into which both processing units are enabled to provide inputs via their respective display interfaces. Thus a display interface in a processing unit may comprise transceiver circuitry enabling the processing unit to transmit electrical signals toward the display.

One of the processing units, for example the less capable or the more capable one, may be configured to control, at least in part, the other processing unit. For example, the less capable processing unit, for example a less capable processing core, may be enabled to cause the more capable processing unit, for example a more capable processing core, to transition into and from a hibernating state. These transitions may be caused to occur by signalling via an inter-processing unit interface, such as for example an inter-core interface.

When transitioning into a hibernating state from an active state, the transitioning processing unit may store its context, at least in part, into a memory, such as for example a pseudostatic random access memory, PSRAM, SRAM, FLASH or ferroelectric RAM, FRAM. The context may comprise, for example, content of registers and/or addressing. When transitioning from a hibernated state using a context stored in memory, a processing unit may resume processing faster and/or from a position where the processing unit was when it was hibernated. This way, a delay experienced by a user may be minimised. Alternative terms occasionally used for context include state and image. In a hibernating state, a clock frequency of the processing unit and/or an associated memory may be set to zero, meaning the processing unit is powered off and does not consume energy. Circuitry configured to provide an operating voltage to at least one processing unit may comprise a power management integrated circuit, PMIC, for example. Since device 110 comprises another processing unit, the hibernated processing unit may be powered completely off while maintaining usability of device 110.

When transitioning from a hibernated state to an active state, the transitioning processing unit may have its clock frequency set to a non-zero value. The transitioning processing unit may read a context from a memory, wherein the context may comprise a previously stored context, for example a context stored in connection with transitioning into the hibernated state, or the context may comprise a default state or context of the processing unit stored into the memory in the factory. The memory may comprise pseudo-static random access memory, SRAM, FLASH and/or FRAM, for example. The memory used by the processing unit transitioning to and from the hibernated state may comprise DDR memory, for example.

With one processing unit in a hibernation state, the non-hibernated processing unit may control device 110. For example, the non-hibernated processing unit may control the display via the display interface comprised in the non-hibernated processing unit. For example, where a less capable processing unit has caused a more capable processing unit to transition to the hibernated state, the less capable processing unit may provide a reduced user experience, for example, via at least in part, the display. An example of a reduced user experience is a mapping experience with a reduced visual experience comprising a black-and-white rendering of the mapping service. The reduced experience may be sufficient for the user to obtain a benefit from it, with the advantage that battery power is conserved by hibernating the more capable processing unit. In some embodiments, a more capable processing unit, such as a microprocessor, may consume a milliampere of current when in a non-hibernated low-power state, while a less capable processing unit, such as a microcontroller, may consume only a microampere when in a non-hibernated low-power state. In non-hibernated states current consumption of processing units may be modified by setting an operating clock frequency to a value between a maximum clock frequency and a minimum non-zero clock frequency. In at least some embodiments, processing units, for example less capable processing units, may be configurable to power down for short periods, such as 10 or 15 microseconds, before being awakened. In the context of this document, this is not referred to as a hibernated state but an active low-power configuration. An average clock frequency calculated over a few such periods and the intervening active periods is a positive non-zero value. A more capable processing unit may be enabled to run the Android operating system, for example.

Triggering events for causing a processing unit to transition to the hibernated state include a user indicating a non-reduced experience is no longer needed, a communication interface of the processing unit no longer being needed and device 110 not having been used for a predetermined length of time. An example indication that a non-reduced experience is no longer needed is where the user deactivates a full version of an application, such as for example a mapping application. Triggering events for causing a processing unit to transition from the hibernated state to an active state may include a user indicating a non-reduced experience is needed, a communication interface of the processing unit being requested and device 110 being interacted with after a period of inactivity. Alternatively or additionally, external events may be configured as triggering events, such as, for example, events based on sensors comprised in device 110. An example of such an external event is a clock-based event which is configured to occur at a preconfigured time of day, such as an alarm clock function, for example. In at least some embodiments, the non-reduced experience comprises use of a graphics mode the non-hibernated processing unit cannot support, but the hibernated processing unit can support. A graphics mode may comprise a combination of a resolution, colour depth and/or refresh rate, for example.

In some embodiments, a user need or user request for the non-reduced experience may be predicted. Such predicting may be based at least in part on a usage pattern of the user, where the user has tended to perform a certain action in the reduced experience before requesting the non-reduced experience. In this case, responsive to a determination the user performs the certain action in the reduced experience, the non-reduced mode may be triggered.

If the processing units reside in separate devices or housings, such as a wrist-top computer and a handheld or fixedly mounted display device for example, a bus may be implemented in a wireless fashion by using a wireless communication protocol. Radio transceiver units functionally connected to their respective processing units may thus perform the function of the bus, forming a personal area network, PAN. The wireless communication protocol may be one used for communication between computers, and/or between any remote sensors, such as a Bluetooth LE or the proprietary ANT+ protocol. These are using direct-sequence spread spectrum, DSSS, modulation techniques and an adaptive isochronous network configuration, respectively. Enabling descriptions of necessary hardware for various implementations for wireless links are available, for example, from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoW-PAN, Wi-Fi®.

In connection with hibernation, the PAN may be kept in operation by the non-hibernated processing unit, such that when hibernation ends, the processing unit leaving the hibernated mode may have access to the PAN without needing to re-establish it.

In some embodiments, microphone data is used in determining, in a first processor, whether to trigger a second processor from hibernation. The first processor may be less capable and consume less energy than the second processor. The first processor may comprise a microcontroller and the second processor may comprise a microprocessor, for example. The microphone data may be compared to reference data and/or preprocessed to identify in the microphone data features enabling determination whether a spoken instructions has been uttered and recorded into the microphone data. Alternatively or in addition to a spoken instruction, an auditory control signal, such as a fire alarm or beep signal, may be searched in the microphone data.

Responsive to the spoken instruction and/or auditory control signal being detected, by the first processor, in the microphone data, the first processor may start the second processor. In some embodiments, the first processor starts the second processor into a state that the first processor selects in dependence of which spoken instruction and/or auditory control signal was in the microphone data. Thus, for example, where the spoken instruction identifies a web search engine, the second processor may be started up into a user interface of this particular web search engine. As a further example, where the auditory control signal is a fire alarm, the second processor may be started into a user interface of an application that provides emergency guidance to the user. Selecting the initial state for the second processor already in the first processor saves time compared to the case where the user or second processor itself selects the state.

In cases where a microphone is comprised in the apparatus, the microphone may in particular be enclosed inside a waterproof casing. While such a casing may prevent high-quality microphone data from being generated, it may allow for microphone quality to be generated that is of sufficient quality for the first processor to determine, whether the spoken instruction and/or auditory control signal is present.

In some embodiments, the first processor is configured to process a notification that arrives in the apparatus, and to decide whether the second processor is needed to handle the notification. The notification may relate to a multimedia message or incoming video call, for example. The notification may relate to a software update presented to the apparatus, wherein the first processor may cause the second processor to leave the hibernating state to handle the notification. The first processor may select, in dependence of the notification, an initial state into which the second processor starts from the hibernated state. For a duration of a software update, the second processor may cause the first processor to transition into a hibernated state.

In general, an instruction from outside the apparatus may be received in the apparatus, and the first processor may responsively cause the second processor to leave the hibernation state. The instruction from outside the apparatus may comprise, for example, the notification, the spoken instruction or the auditory control signal.

Figure 2:
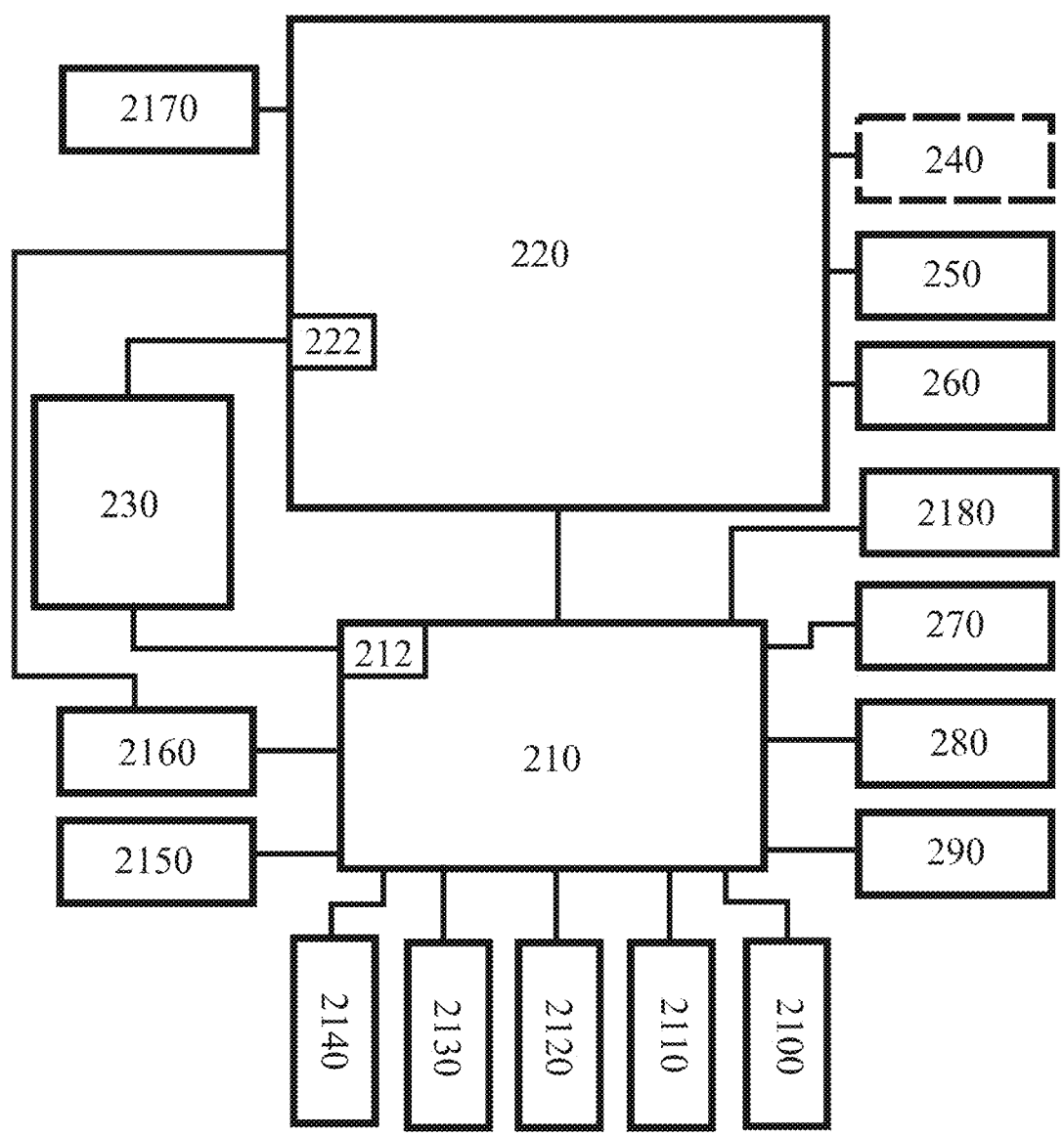
FIG. 2 illustrates a first example apparatus capable of supporting at least some embodiments of the present invention.

FIG. 2 illustrates a first example apparatus capable of supporting at least some embodiments of the present invention. The illustrated apparatus comprises a microcontroller 210 and a microprocessor 220. Microcontroller 210 may comprise, for example, a Silabs EMF32 or a Renesas RL78 microcontroller, or similar. Microprocessor 220 may comprise, for example, a Qualcomm Snapdragon processor or an ARM Cortex-based processor. Microcontroller 210 and microprocessor 220 are in the example of FIG. 2 communicatively coupled with an inter-core interface, which may comprise, for example, a serial or a parallel communication interface. More generally an interface disposed between microcontroller 210 and microprocessor 220 may be considered an inter-processing unit interface.

Microcontroller 210 is communicatively coupled, in the illustrated example, with a buzzer 270, a universal serial bus, USB, interface 280, a pressure sensor 290, an acceleration sensor 2100, a gyroscope 2110, a magnetometer 2120, satellite positioning circuitry 2130, a Bluetooth interface 2140, user interface buttons 2150 and a touch interface 2160. Pressure sensor 290 may comprise an atmospheric pressure sensor, for example.

Microprocessor 220 is communicatively coupled with an optional cellular interface 240, a non-cellular interface 250 and a USB interface 260. Microprocessor 220 is further communicatively coupled, via microprocessor display interface 222, with display 230. Microcontroller 210 is likewise communicatively coupled, via microcontroller display interface 212, with display 230. Microprocessor display interface 222 may comprise communication circuitry comprised in microprocessor 220. Microcontroller display interface 212 may comprise communication circuitry comprised in microcontroller 210.

Microcontroller 210 may be configured to determine whether triggering events occur, wherein responsive to the triggering events microcontroller 210 may be configured to cause microprocessor 220 to transition into and out of the hibernating state described above. When microprocessor 220 is in the hibernating state, microcontroller 210 may control display 230 via microcontroller display interface 222. Microcontroller 210 may thus provide, when microprocessor 220 is hibernated, for example, a reduced experience to a user via display 230.

Responsive to a triggering event, microcontroller 210 may cause microprocessor 220 to transition from the hibernated state to an active state. For example, where a user indicates, for example via buttons 2150, that he wishes to originate a cellular communication connection, microcontroller 210 may cause microprocessor 220 to transition to an active state since cellular interface 240 is controllable by microprocessor 220, but, in the example of FIG. 2, not directly usable by microcontroller 210. In some embodiments, when microprocessor 220 is hibernated, also cellular interface 240 is in a hibernated state. Cellular interface 240 may comprise an electrical interface to a cellular transceiver, for example. Cellular interface 240 may comprise control circuitry of a cellular transceiver.

In various embodiments, at least two elements illustrated in FIG. 2 may be integrated on a same integrated circuit. For example, microprocessor 220 and microcontroller 210 may be disposed as processing cores in a same integrated circuit. Where this is the case, for example, cellular interface 240 may be a cellular interface of this integrated circuit, comprised in this integrated circuit, with cellular interface 240 being controllable by microprocessor 220 but not by microcontroller 210. In other words, individual hardware features of the integrated circuit may be controllable by one of microcontroller 210 and microprocessor 220, but not both. On the other hand, some hardware features may be controllable by either processing unit. For example, USB interface 260 and USB interface 280 may be in such an integrated embodiment one and the same USB interface of the integrated circuit, controllable by either processing core.

In FIG. 2 are further illustrated memory 2170 and memory 2180.

Memory 2170 is used by microprocessor 220, and may be based on a DDR memory technology, such as for example DDR2 or DDR3, for example. Memory 2180 is used by microcontroller 210, and may be based on SRAM technology, for example.

Figure 3:
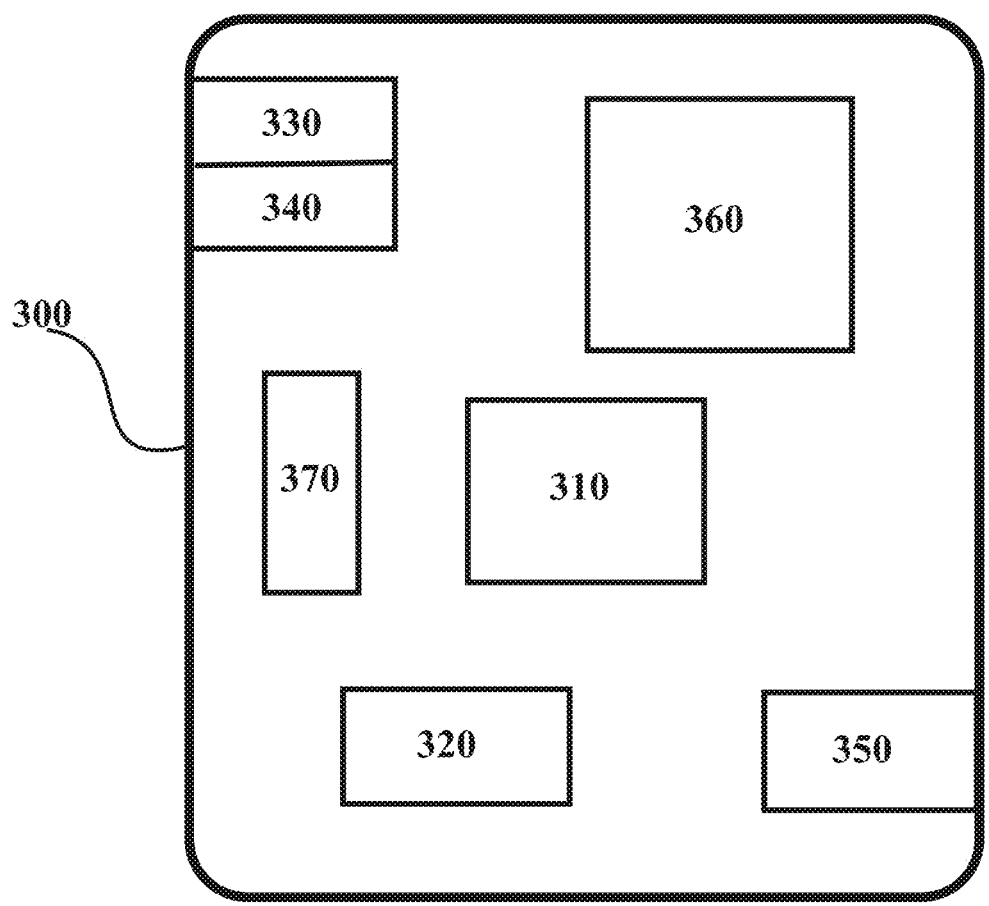
FIG. 3 illustrates a second example apparatus capable of supporting at least some embodiments of the present invention.

FIG. 3 illustrates a second example apparatus capable of supporting at least some embodiments of the present invention.

Illustrated is device 300, which may comprise, for example, an embedded device 110 of FIG. 1. Comprised in device 300 is processor 310, which may comprise, for example, a single- or multi-core processor wherein a single-core processor comprises one processing core and a multi-core processor comprises more than one processing core. Processor 310 may correspond to the structure illustrated in FIG. 2, with the exception of display 230, for example. Processor 310 may comprise more than one processor or processing unit. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise volatile and/or non-volatile memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example. Transmitter 330 and/or receiver 340 may be controllable via cellular interface 240, non-cellular interface 250 and/or USB interface 280 of FIG. 2, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. User input to UI 360 may be based on patterns, such as, for example, where a user shakes device 300 to initiate actions via UI 360. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games. UI 360 may comprise, for example, buttons 2150 and display 230 of FIG. 2.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
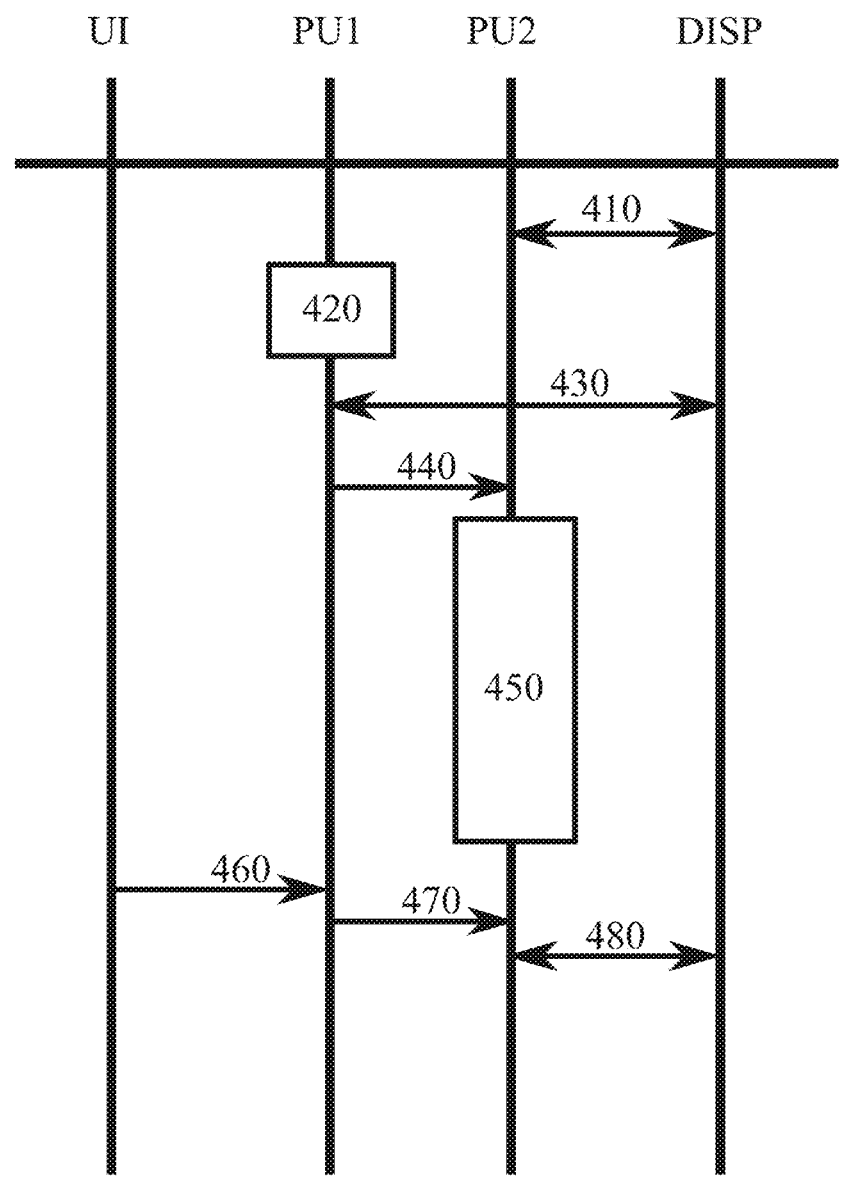
FIG. 4 illustrates signalling in accordance with at least some embodiments of the present invention.

FIG. 4 illustrates signalling in accordance with at least some embodiments of the present invention. On the vertical axes are disposed, from left to right, user interface UI, processing unit PU1, processing unit 2 PU2, and finally display DISP. Time advances from the top toward the bottom. Processing unit 2 may have higher processing capability, and be associated with a higher current consumption, than processing unit 1.

In phase 410, processing unit 2, which may comprise a processing core, controls the display. For example, processing unit 2 may run an application and provide to the display instructions to display information reflective of the state of the application.

In phase 420, processing unit 1 determines that a triggering event occurs, the triggering event being associated with a transition of processing unit 2 from an active state to a hibernated state. Processing unit 1 may determine an occurrence of a triggering event by receiving from processing unit 2 an indication that a task performed by processing unit 2 has been completed, for example. As discussed above, the hibernating state may comprise that a clock frequency of processing unit 2 is set to zero. Responsive to the determination of phase 420, processing unit 1 assumes control of the display in phase 430, and causes processing unit 2 to transition to the hibernating state in phase 440. Subsequently, in phase 450, processing unit 2 is in the hibernated state. When processing unit 2 is in the hibernated state, battery resources of the device may be depleted at a reduced rate. In some embodiments, phase 430 may start at the same time as phase 440 occurs, or phase 440 may take place before phase 430 starts.

In phase 460, a user interacts with the user interface UI in such a way that processing unit 1 determines a triggering event to transition processing unit 2 from the hibernated state to an active state. For example, the user may trigger a web browser application that requires a connectivity capability that only processing unit 2 can provide. Responsively, in phase 470 processing unit 1 causes processing unit 2 to wake up from the hibernating state. As a response, processing unit 2 may read a state from a memory and wake up to this state, and assume control of the display, which is illustrated as phase 480.

Figure 5:
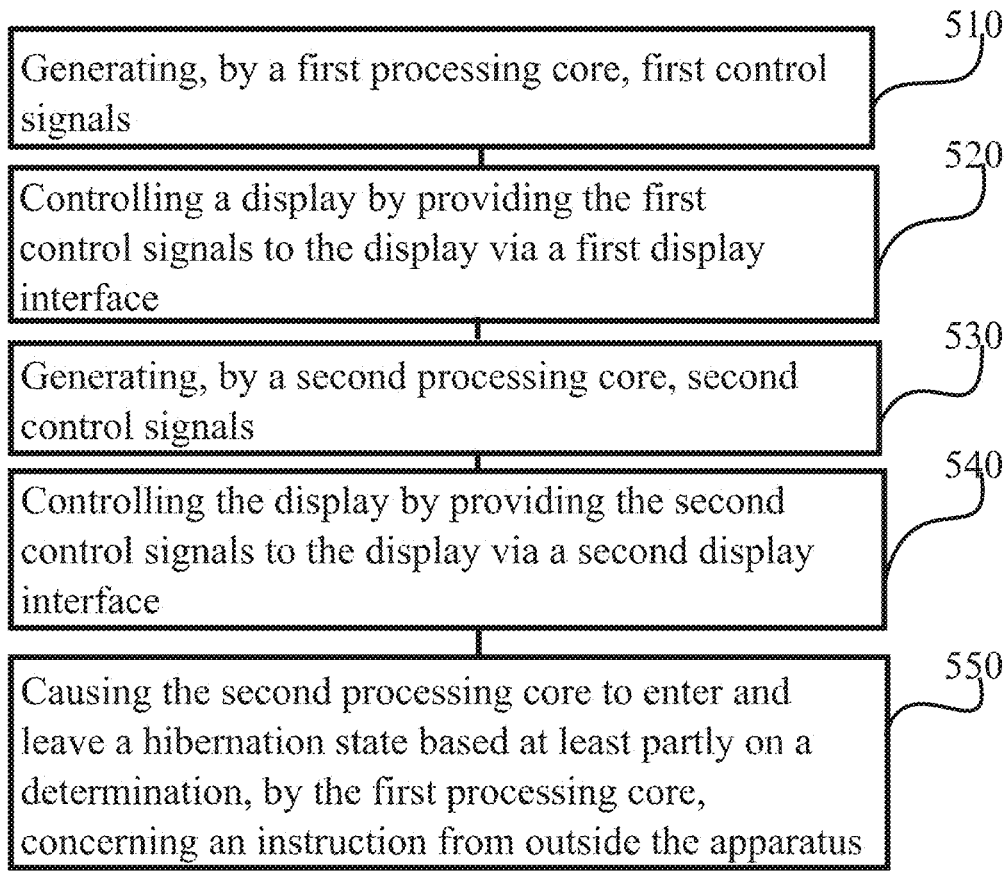
FIG. 5 is a first flow chart of a first method in accordance with at least some embodiments of the present invention.

FIG. 5 is a first flow chart of a method involving two processing cores in accordance with at least some embodiments of the present invention. The phases of the illustrated method may be performed in device 110 of FIG. 1, or in the apparatus of FIG. 2, for example.

Phase 510 comprises generating, by a first processing core, first control signals. Phase 520 comprises controlling a display by providing the first control signals to the display via a first display interface. Phase 530 comprises generating, by a second processing core, second control signals. Phase 540 comprises controlling the display by providing the second control signals to the display via a second display interface. Finally, phase 550 comprises causing the second processing core to enter and leave a hibernation state based at least partly on a determination, by the first processing core, concerning an instruction from outside the apparatus.

Figure 6:
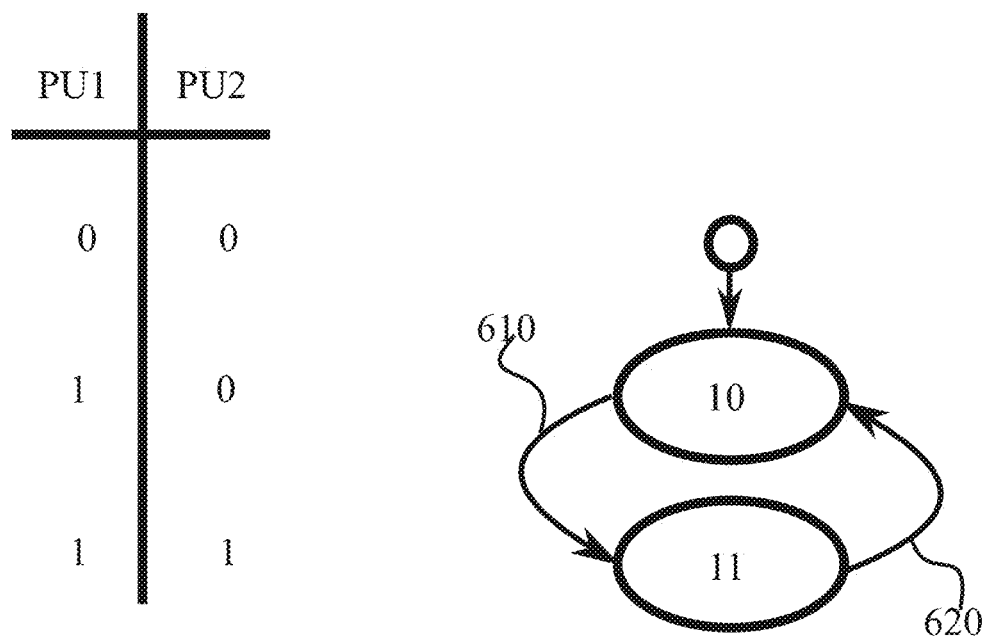
FIG. 6 is a state transition diagram in accordance with at least some embodiments of the present invention.

FIG. 6 is a state transition diagram in accordance with at least some embodiments of the present invention.

PU1 corresponds to processing unit 1, for example, a less capable processing unit. PU2 corresponds to processing unit 2, for example, a more capable processing unit. These units may be similar to those in discussed in connection with FIG. 4, for example. In an initial state, the device comprising PU1 and PU2 is in an inactive state, with zeros indicating the states of both PU1 and PU2. PU1 and PU2 are both switched off.

Starting from the initial power-off state, first PU1 is powered up, indicated as a "1" in the state of PU1, while PU2 remains in an off state, denoted by zero. Thus the compound state is "10", corresponding to a case where PU1 is active and PU2 is not. In this state, the device may offer a reduced experience to a user and consume relatively little current from battery reserves.

In addition to, or alternatively to, a power-off state PU1 and/or PU2 may have an intermediate low-power state from which it may be transitioned to an active state faster than from a complete power-off state. For example, a processing unit may be set to such an intermediate low-power state before being set to a power-off state. In case the processing unit is needed soon afterward, it may be caused to transition back to the power-up state. If no need for the processing unit is identified within a preconfigured time, the processing unit may be caused to transition from the intermediate low-power state to a power-off state.

Arrow 610 denotes a transition from state "10" to state "11", in other words, a transition where PU2 is transitioned from the hibernated state to an active state, for example, a state where its clock frequency is non-zero. PU1 may cause the transition denoted by arrow 610 to occur, for example, responsive to a triggering event. In state "11", the device may be able to offer a richer experience, at the cost of faster battery power consumption.

Arrow 620 denotes a transition from state "11" to state "10", in other words, a transition where PU2 is transitioned from an active state to the hibernated state. PU1 may cause the transition denoted by arrow 620 to occur, for example, responsive to a triggering event.

Figure 7A:
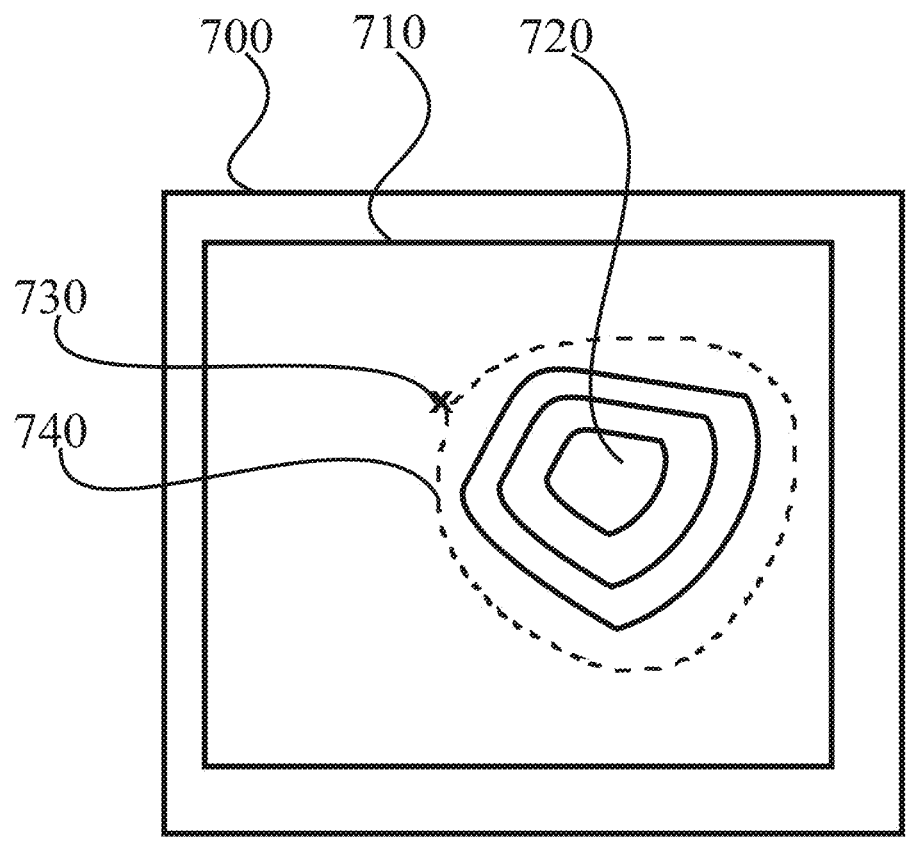
FIG. 7A illustrates an example user interface in accordance with at least some embodiments of the present invention.

FIG. 7A illustrates an example user interface in accordance with at least some embodiments of the present invention. The user interface may be comprised in device 110 of FIG. 1A or FIG. 1B, for example. Display 700 is configured to provide a user interface display to the user. Display area 710 provides an application level display to the user. In application level display 710 is comprised a map 720, which may display, for example, terrain and/or elevation information. In the illustrated example, a hill is displayed in the map 720.

According to some embodiments, the user may be presented with a selection of updated heatmaps created for different sports activities in locations outside, but adjacent to said present location. Thus the display 700 may show a map 720 with a hill in a neighbouring town, county or borough, for example. The rule of what is within the present location of the device 110 and what is in adjacent location may be set by the boundaries between such areas, if the positioning system used contain such data, or simply by a radius form the present location, e.g. 10 km.

Some activities preferred by the user, such as cycling for example, may involve moving long distances and/or for a lengthy time. In the planning of such activities it may be beneficial to have heatmaps also covering locations nearby the present one.

A start point 730 is illustrated in the user interface, as is a route 740, which is indicated with a dashed line. In this example, the route may be traversed twice to obtain the physical exercise effect the user wants. The route proceeds along a relatively constant elevation around the hill, and when traversed twice provides an opportunity to interrupt the activity session halfway through, as the user passes start point 730. To interrupt the session, the user can simply stop at start point 730 instead of beginning a second lap along the route. In this example the area of map 720 may be indicated in the thematic map database as being associated with past activity sessions of a corresponding, or indeed same, activity type as the session the user selects. The route may be determined, in part, based on mapping information obtained from a mapping service, such as a proprietary service, HERE maps or Google maps, for example. Elevation information may be obtained from the same, or similar, service.

Figure 7B:
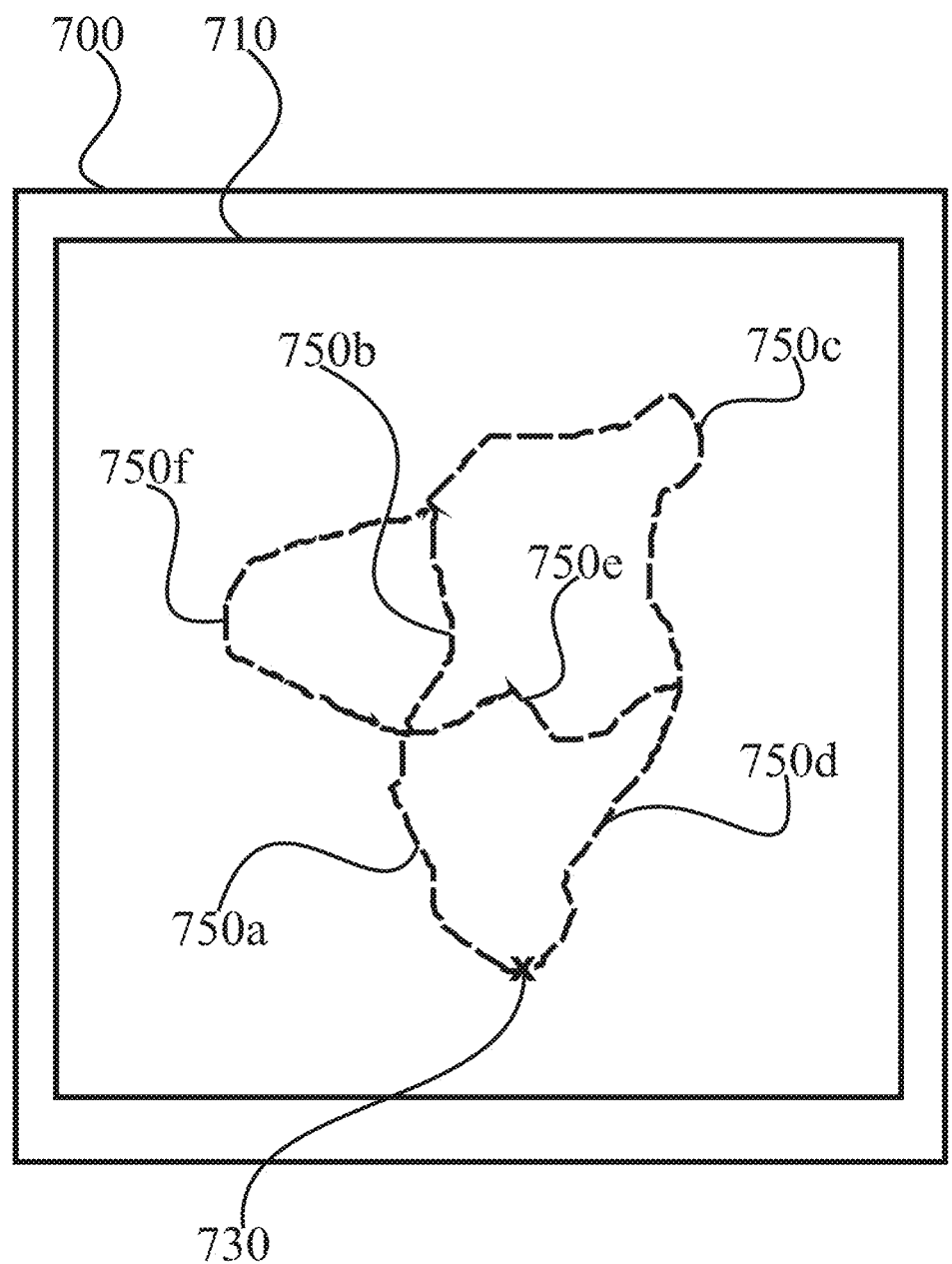
FIG. 7B illustrates an example user interface in accordance with at least some embodiments of the present invention.

FIG. 7B illustrates a second example of a user interface in accordance with at least some embodiments of the present invention. Like numbering denotes like elements as in FIG. 7A. In FIG. 7B, a route planning view is presented in application level display area 710. The route planning view displays a route segment network which comprises segment 750a, segment 750b, segment 750c, segment 750d, segment 750e, and segment 750f. The user can complete a closed route from and to start point 730 via various combinatorial options. For example, a first option comprises segments

750*a*, 750*b*, 750*c* and 750*d*. For example, a second option comprises segments 750*a*, 750*b*, 750*c*, in that order, followed by segments 750*e* and 750*a*, in that order. The segments may be obtained based at least partly on a local map and/or a thematic map database, for example.

The user may be presented with information concerning route options, for example for the first option, an estimated energy consumption associated with an activity session along the route defined by the first option, and likewise for the second option. The user may, explicitly or implicitly, select one of the presented options, and along the route deviate therefrom to use a different set of route segments. For example, a user setting on along the first option, may decide to shorten the activity session by taking segments 750*e* and 750*d* back to the start point 730. Alternatively, the user may decide to lengthen the session by taking, in the first option, segment 750*f* instead of segment 750*b*.

In some embodiments, information is presented separately concerning route segments, to enable the user to design a route with greater precision. For example, an energy consumption associated with segment 750*a*, when used as a route segment in an activity session of a given type, may be presented. Likewise, other physiological effects, such as EPOC or oxygen consumption, may be presented in addition to, or alternatively to, the energy consumption.

Figure 8:
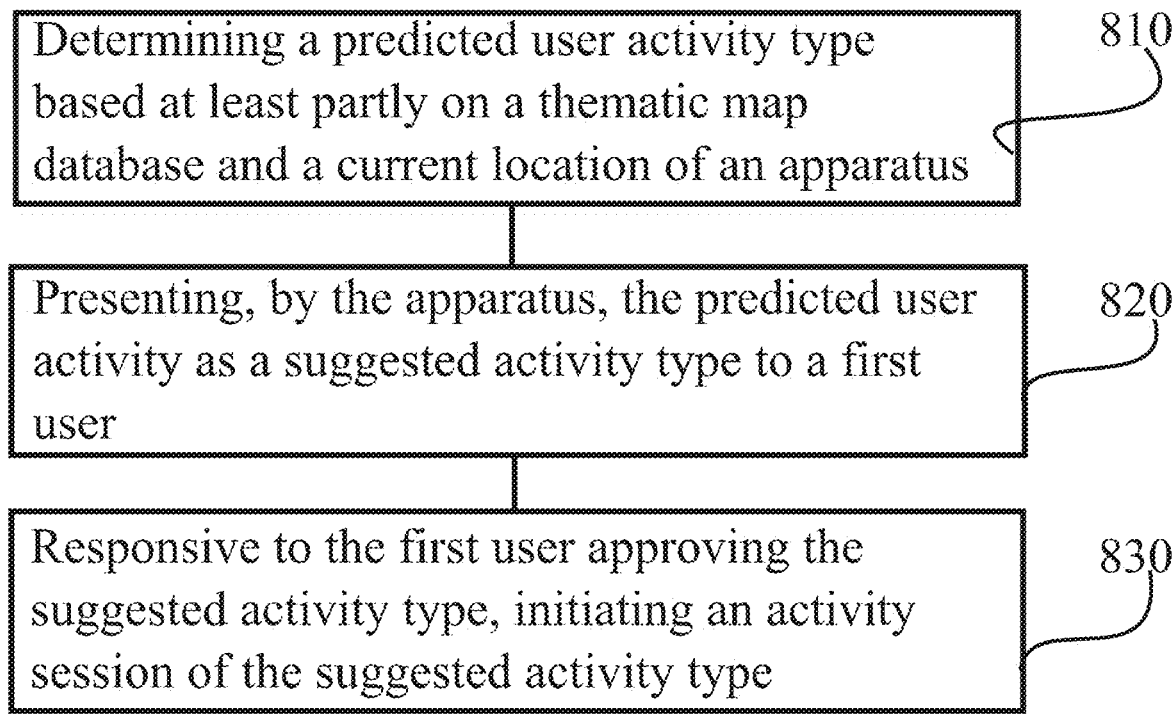
FIG. 8 is a flow graph of a method in accordance with at least some embodiments of the present invention.

FIG. 8 is a flow graph of a method in accordance with at least some embodiments of the present invention. The phases of the illustrated method may be performed in device 110, for example, or in a control device configured to control the functioning of device 110, when implanted therein, for example.

Phase 810 comprises determining a predicted user activity type based at least partly on a thematic map database and a current location of an apparatus. Phase 820 comprises presenting, by the apparatus, the predicted user activity type as a suggested activity type to a first user. Finally, phase 830 comprises, responsive to the first user approving the suggested activity type, initiating an activity session of the suggested activity type.

Figure 9:
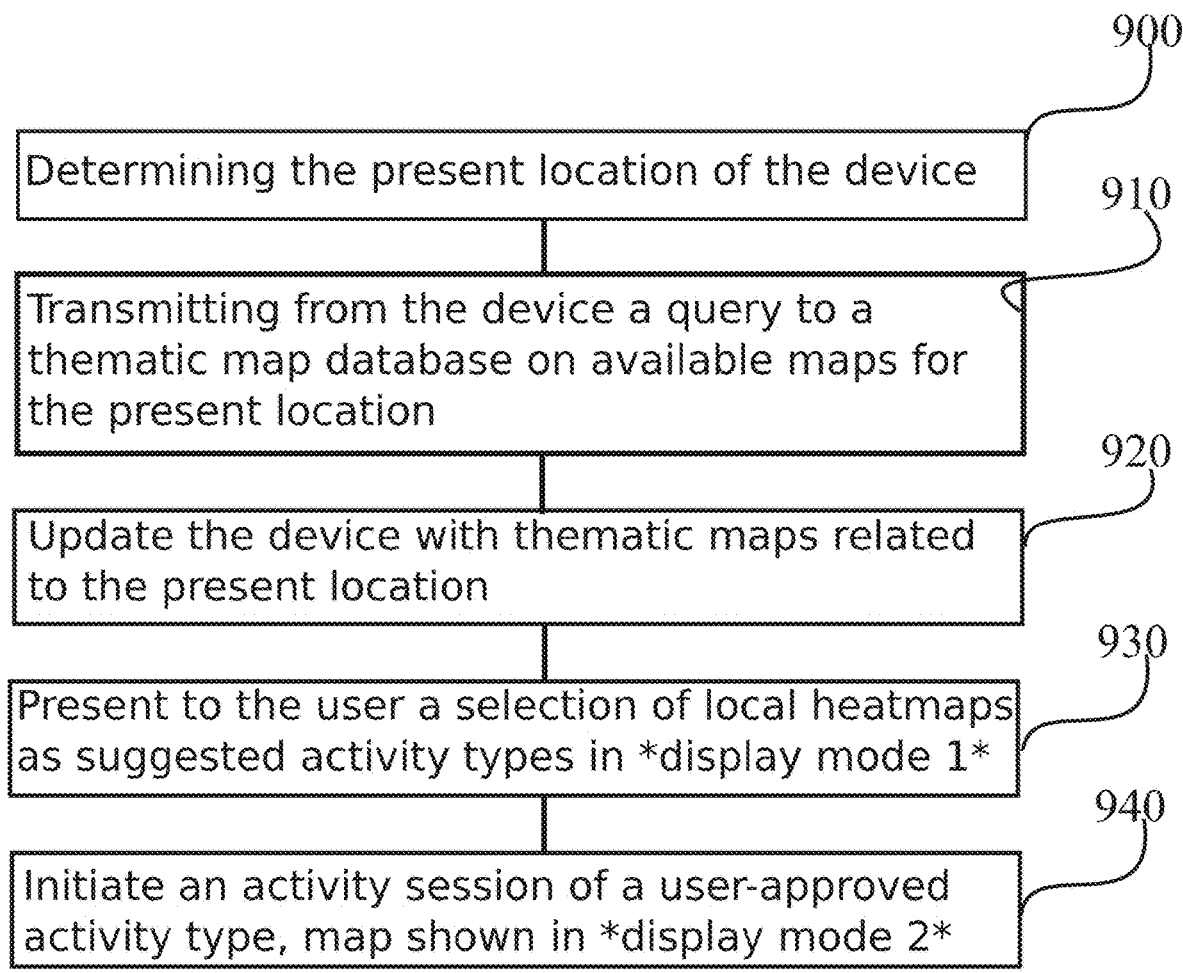
FIG. 9 is a flow graph of a method in accordance with at least some embodiments of the present invention.

FIG. 9 is a flow graph of a method in accordance with at least some embodiments of the present invention. The phases of the illustrated method may be performed in device 110, for example, or in a control device configured to control the functioning of device 110, when implanted therein, for example.

Phase 900 comprises determining the present location of the apparatus. Phase 910 comprises the action of transmitting from said apparatus a query to a thematic map database server. The query may comprise an indication of the current location of the apparatus. In phase 920 the device 110 is updated with thematic maps related to the location by downloading thematic map data and storing the thematic map data in a memory of the device. In phase 930 the user is presented in a first display mode with a selection of local thematic maps as suggested activity types. The thematic maps may be selected to be downloaded based on at least one of the following criteria: a pre-recorded user preference, user activity history, intensity of activities in said location, special activities in said location, time of the day, time of the year, or a second location adjacent to said present location. Finally, in phase 940 and in response to the user approving a suggested activity type, an activity session is initiated and displayed in a second display mode.

Figure 10:
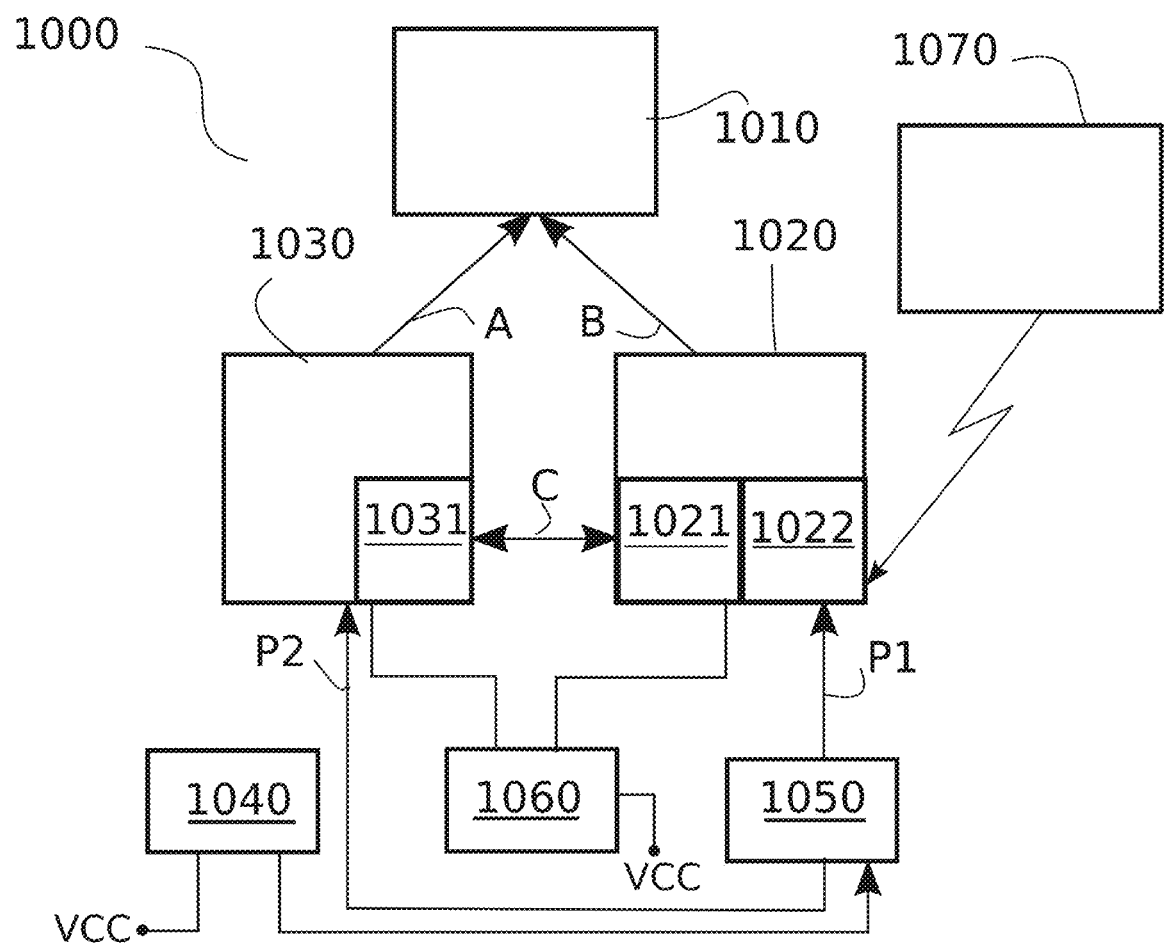
FIG. 10 shows a an exemplary hardware configuration which is able to support at least some embodiments of the invention.

In FIG. 10 is shown an exemplary hardware configuration of a two-processor wristwatch-type device 1000, which is able to support at least some embodiments of the invention. A high-power first microprocessor or a microcontroller unit (MCU) 1020 comprising a first processing core and a low-power second application processor (AP) or a microcontroller unit 1030 comprising a second processing core are shown. Alternatively, the two or more processing cores with different characteristics may reside within the same microprocessor 1020. Both processors (or cores) are able to control a device display 1010 and to show information on the display 1010, as indicated by arrows A and B, respectively. The display 1010 may be a touch-screen display. A sensor, such as a GPS sensor (not shown, see e.g. item 2130 in FIG. 2) provides location information to at least one of the processing cores, enabling the device to determine its location.

During normal operation, when thematic maps, which may be downloaded from the server 1070 through a communication interface 1022 of the first processor 1020, of suggested activities is presented to a user on the display 1010, the device 1000 assumes a first display mode controlled by the first processor 1020. The communication interface 1022 may correspond to any or several of the interfaces 240-260 of FIG. 2, for example. The selection of an activity session may have been based on user selection input, a pre-recorded user preference, user activity history, intensity of activities in said location, special activities in said location, time of the day, time of the year, or a second location adjacent to said present location.

The first processor 1020 initiates the selected activity and displays to the user in the first adisplay mode performance-related information relating to physical performance of the user, including sensor information relating to position, distance, speed, heart rate etc. This first activity mode is active for a predetermined time, or ends when, for example, acceleration sensor information indicates that the user is in a steady performance mode, based on cadence, rhythmic movements, heart rate, etc.

The first processor 1020 may then produce a reduced version of the thematic map of a selected activity, or the reduced maps may be downloaded from the server 1070 on demand. The demand may be based on the type of the device, the preferences of the user and/or the location of the user, and the server provides the appropriate selection of activities for downloading.

The device 1000 may enter a first power-save mode by determining the last known context of the user and/or the performance. Having determined from the context what to display in a second display mode, the first processor 1020 may enter a hibernating mode and switch from a first display mode to a second display mode. In a two-processor embodiment, the second display mode may be controlled by the second processor 1030. In the second display mode, time and other information relating to said activity may be shown, such as the location of the user provided by a GPS sensor. With a "reduced" map is here meant a reduced version of a thematic map. This may for example mean one or several of the following: less or no colours, lesser display resolution, slower display updates, reduced content, etc.

In some embodiments, where two processors are involved, first and second power-save modes may be used. The preferred sequence from a power-saving point of view would be to first hibernate the first processing core, which consumes more power. This may be controlled by the low-power second processor, for example when there is nothing to left to execute for the first processor. In some alternative embodiments where on only one processor is used, only one power-save mode may be used. In both cases, the final power-save mode involves a complete or almost complete shutdown of any the processing cores in the device, while a clock unit, such as a Real Time Clock (RTC) unit 1060 is used to keep track of the time. When a motion sensor or a press of button indicates the user is looking at the display, the RTC unit provides a time signal to show time-related context on the display, such as the time and a reduced thematic map.

Reduced thematic maps may be downloaded from the server 1070, or they may be produced by the first processor 1020 and stored in its memory 1021. In a two-processing core embodiment, the image(s) of the reduced thematic map may be copied (arrow C in FIG. 10) to a memory 1031 of the low-power second processor 1030, to be shown therefrom in a second display mode.

As the performance of the user continues on a steady path and there is no indication of the user looking at the display, the device 1000 may enter a second power-save mode by switching off the second display mode and putting the second processing core 1030 in a hibernating mode.

In a second power-save mode, the only process running in the device may be the real time clock in the RTC unit 1060. The RTC unit is preferably a separate unit connected to a battery of the device, for example. The processing cores may then be completely shut off. RTC units may also be integrated in either one of the processors 1020 or 1030, or in both, but would then require at least some hardware around the processor in question to be powered up, with a power consumption of a few microamperes. Which alternative RTC units to use is a matter of design choice.

In a one-processor embodiment, the transfer of maps internally in the device is of course not needed, otherwise a second display mode may be used in the same fashion as with two processors, and the reduced thematic map is then shown from the memory 1021 on the display 1010. The single processor may thus have three levels of operation and power consumption: full operation, reduced operation and hibernation (with or without an internal RTC clock). During the performance, an acceleration sensor 1040 may continuously sense the movement of the device 1000. In some embodiments, the processor may be left in a reduced operation mode, if the activity and/or context are deemed to require a fast wakeup of the core. Wakeup from a state of hibernation will take longer. Various power-saving modes may also be entered when the device 1000 deems the user is sleeping, for example. Indeed, various sensor inputs and their combinations may be used for determining the context of the user and select an appropriate time to enter a particular power-save mode. Such input may include the time (e.g. night-time), acceleration sensor input, ambient light, position signals from a GPS sensor, etc.

Reversing the power-saving sequence may be initiated simply by a user pressing a button, or it may be automatic. In some embodiments, for example, when a vertical move is sensed by a smart acceleration sensor 1040, the corresponding sensor signal may have pre-recorded threshold values that when exceeded are interpreted as a raise of the arm in an attempted reading of the display 1010. A power controller 1050 then powers up the high-power processor 1020, or the low-power processor 1030, depending on the embodiment (one or two processors) and the previous context or display mode of the device 1000). In order to speed up the wakeup of hibernating processing cores, their power supplies (switched-mode power supply SMPS, for example) may be left on. Another alternative embodiment is to switch the SMPS off and connect a low-dropout (LDO) regulator as a fast power source for the hibernating processing core in parallel over the SMPS.

In some embodiments, the RTC unit may also start a processor. For example, if a relatively long time has passed since the user last made an attempt to look at the display, the context is difficult to predict and may have changed. The user would then no longer be interested in looking at a reduced thematic map that probably does not show the correct location and/or activity of the user anymore. Instead of just fetching for display a stored thematic map relating to a wrong context, the time delay since the last display action may be used as an indicator that the context has probably changed. As the RTC unit reveals this time delay, the information may be used for example to activate a GPS sensor in order to check the location and start at least a low power processor to update the context of the user, including fetching a thematic map which matches the current location of the user.

The context-dependent images may be fetched from a memory by using a LDO regulator as the power source for a hibernating processor, which provides a fast wakeup. After wakeup, transfer of stored images may take place directly from an internal memory of the processor or from an external memory unit to the display.

Figure 11:
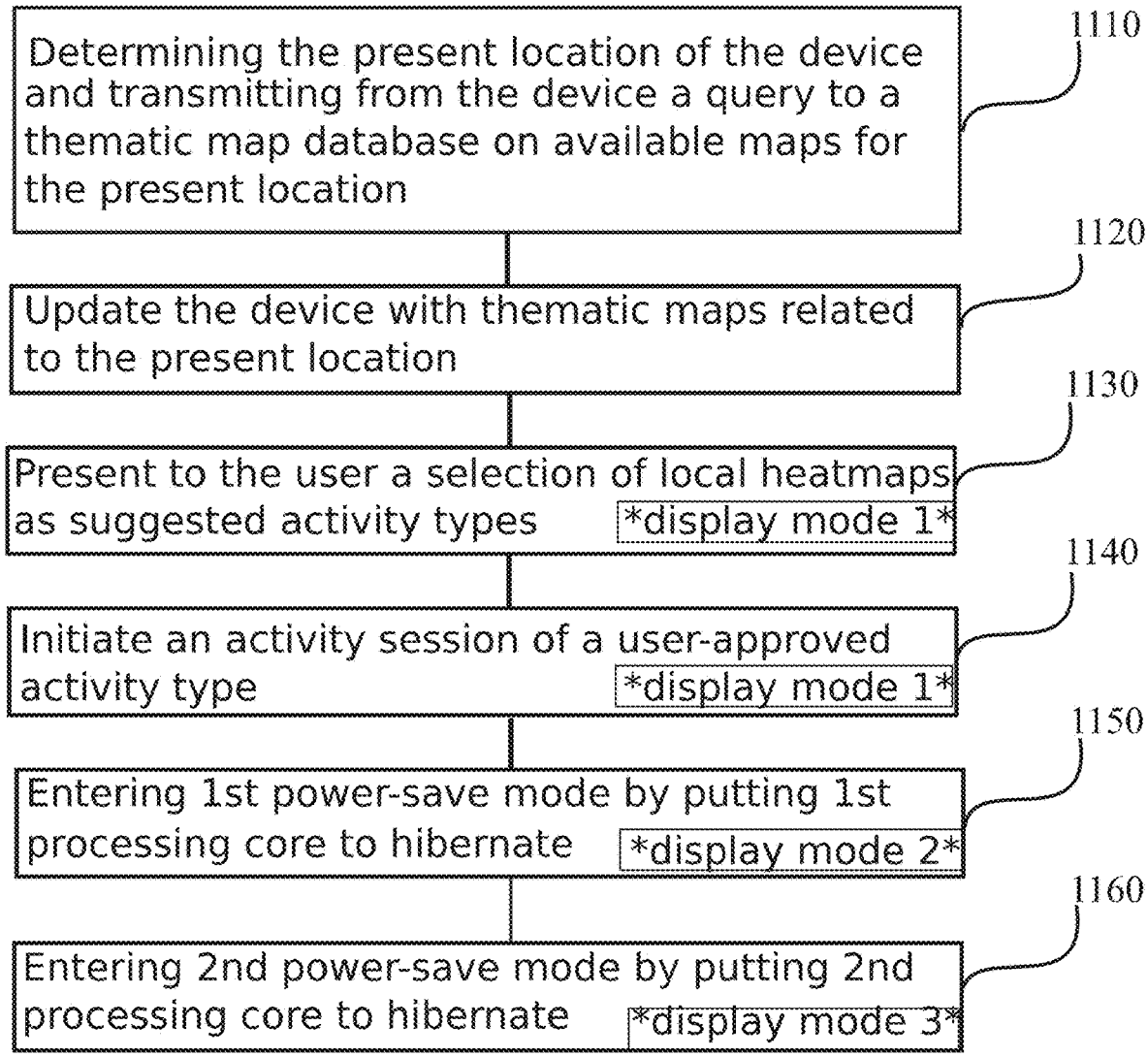
FIG. 11 is a flow graph of a method in accordance with at least some embodiments of the present invention.

Reference is now made to FIG. 11, which shows a flowchart of the main steps performed by an apparatus according to the invention. The apparatus comprises at least two processing cores, at least one display with at least two display modes, at least one memory including a computer program code.

In step 1110, the present location of the apparatus is determined and a query is transmitted from the apparatus to a thematic map database server for available activity or thematic maps at the current location of the apparatus.

In step 1120, the apparatus is update with thematic maps related to the current location from the thematic map database server, by downloading thematic map data and storing the thematic map data in said at least one memory of the apparatus.

At least one downloaded thematic map is presented to a user of the apparatus as a selection of local heatmaps as a suggested activity in step 1130, using a first display mode, as presented by a high-power first processing core. The activity session may be selected based on at least one of the following criteria: user selection input, a pre-recorded user preference, user activity history, intensity of activities in said location, special activities in said location, time of the day, time of the year, or a second location adjacent to said present location.

In step 1140, a selected activity is initiated and displayed to the user in the display mode, containing performance-related information relating to physical performance of the user in the activity.

Now, in step 1150, a first power-save mode is entered, by putting the first processing core in a hibernating mode, and by switching from the first display mode to a second display mode. The second display mode may display to the user, using a second low power processing core, the time and static information relating to said activity. In some embodiments, in predefined time intervals a pre-calculated static thematic map relating to the activity and the current time is shown. As explained in connection with FIG. 10, a graphically reduced thematic map may be used in this second display mode.

Finally, in step 1160 a second power-save mode is entered by switching off the second display mode and putting also the low-power second processing core in a hibernating mode. A third display mode is entered, where a Real Time Clock (RTC) unit is used to keep the time. Pre-stored thematic maps may be shown when requested by a user input or a sensor request, showing the predicted location of the user on the map at that time.

The apparatus may now go stepwise back to the second and/or first display modes by activating the second and/or first processing cores from hibernation. This may be triggered on at least one of the following criteria: user selection input, acceleration data input from an acceleration sensor in said apparatus indicating a display reading posture of said user.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

INDUSTRIAL APPLICABILITY

At least some embodiments of the present invention find industrial application in enhancing device usability and/or personal safety.

The invention claimed is:

1. An apparatus, such as a personal device, comprising at least one processor with at least one processing core, at least one display, at least one sensor, at least one memory including a computer program code, the at least one memory and the computer program code being configured to, with the at least one processing core, cause the apparatus at least to:
   determine the location of the apparatus by means of a sensor providing location information to said at least one processing core;
   transmit from said apparatus a query to a thematic map database server, the query comprising an indication of the current location of the apparatus;
   update said apparatus with thematic maps related to said location from said server by downloading thematic map data and storing the thematic map data in said at least one memory of said apparatus;
   present to a user of said apparatus on a display in a first display mode on said at least one display at least one downloaded thematic map as one of a suggested activity;
   selecting an activity session based on at least one of the following criteria: user selection input, a pre-recorded user preference, user activity history, intensity of activities in said location, special activities in said location, time of the day, time of the year, the location of said activity or a second location adjacent to said present location; and
   performing in a sequence the following steps:
   a) initiating a selected activity and displaying to the user by a first processing core in said first display mode performance-related information relating to physical performance of said user in said activity;
   b) entering a first power-save mode by switching from said first display mode to a second display mode displaying to the user at least the time and a thematic map with reduced functionality relating to said activity,
   c) entering a second power-save mode by putting said at least one processing core in a hibernating mode; and
   d) entering a third display mode where a clock unit updates said display in predefined time intervals at least with the time and at least one item of pre-calculated information selected from the following: a static thematic map relating to said activity and the current time, date, moon phase, tide, sun position.

2. The apparatus according to claim 1, comprising at least two processing cores, wherein a selected activity is initiated by a first processing core in said first display mode, said first power-save mode is entered by putting said first processing core in a hibernating mode and by switching to said second display mode using a second processing core, and said second power-save mode is entered by putting said second processing core in a hibernating mode.

3. The apparatus according to claim 1, wherein said clock unit is a Real Time Clock (RTC) unit which updates said display in said second power-save mode in predefined time intervals with reduced thematic maps stored in said at least one memory of the apparatus, wherein said reduced thematic map to be shown is selected based on the current time as registered by said RTC unit.

4. The apparatus according to claim 1, wherein said performed sequence in order a) to c) is reversed in order c) to a) based on at least one of the following criteria: user selection input or acceleration data input from an acceleration sensor in said apparatus indicating a display reading posture of said user.

5. The apparatus according to claim 1, wherein the apparatus is configured to present to the user as one activity type a selection of updated thematic heatmaps created for different sports activities in said location.

6. The apparatus according to claim 1, wherein the apparatus is configured to present to the user as one activity type a selection of updated thematic heatmaps created for different sports activities in second locations outside but adjacent to said present location.

7. The apparatus according to claim 1, wherein the apparatus is configured to automatically update thematic maps related to said location from said thematic map database server when the apparatus is being charged and is connected to a wireless network with coverage in said present location.

8. The apparatus according to claim 1, wherein the updated thematic maps are stored in said at least one memory of said apparatus for the offline use of said heatmaps in said activity sessions.

9. The apparatus according to claim 1, wherein said thematic maps with reduced functionality are pre-calculated by said first processing core and stored in said at least one memory of said apparatus to be displayed to the user in said second display mode by said second processing core.

10. The apparatus according to claim 1, wherein said thematic maps with reduced functionality are pre-calculated by said second processing core and stored in said at least one memory of said apparatus to be displayed to the user in said second display mode by said second processing core.

11. A method for presenting information to a user of an apparatus, such as a personal device, said device comprising at least one processor having at least on processing core, at least one display, at least one sensor and at least one memory including computer program code, said method comprising the steps of:
   determining the location of the apparatus by means of a sensor providing location information to said at least one processing core;
   transmitting from said apparatus a query to a thematic map database server, the query comprising an indication of the current location of the apparatus;
   updating said apparatus with thematic maps related to said location from said server by downloading thematic map data and storing the thematic map data in said at least one memory of said apparatus;
   presenting to the user in a first display mode on said at least one display at least one downloaded thematic map as one of a suggested activity;
   selecting an activity session based on at least one of the following criteria: user selection input, a pre-recorded user preference, user activity history, intensity of activities in said location, special activities in said location, time of the day, time of the year, the location of said activity or a second location adjacent to said present location; and
   performing in a sequence the following steps:
      a) initiating a selected activity and displaying to the user in said first display mode performance-related information relating to physical performance of said user in said activity;
      b) entering a first power-save mode by switching from said first display mode to a second display mode displaying to the user at least the time and a thematic map with reduced functionality relating to said activity,
      c) entering a second power-save mode by putting said at least one processing core in a hibernating mode; and
      d) entering a third display mode where a clock unit updates said display in predefined time intervals at least with the time and at least one item of pre-calculated information selected from the following: a static thematic map relating to said activity and the current time, date, moon phase, tide, sun position.

12. The method according to claim 11, further comprising providing an apparatus comprising at least two processing cores, wherein the step of initiating a selected activity is performed by a first processing core in said first display mode, the step of entering said first power-save mode is performed by putting said first processing core in a hibernating mode and by switching to said second display mode using a second processing core, and the step of entering said second power-save mode is performed by putting said second processing core in a hibernating mode.

13. The method according to claim 11, wherein the step of entering said second power-save mode comprises a further step of entering a third display mode, where said display is the updated with predefined time intervals at least with the time with a Real Time Clock (RTC) unit.

14. The method according to claim 11, including the step of reversing said sequence performed in order a) to d) in order d) to a) based on at least one of the following criteria: user selection input or acceleration data input from an acceleration sensor in said apparatus indicating a display reading posture of said user.

15. The method according to claim 11, further comprising the step of pre-calculating said thematic maps with reduced functionality and storing them in said at least one memory.

* * * * *